US012589577B2

(12) United States Patent (10) Patent No.: US 12,589,577 B2
Pengel et al. (45) Date of Patent: Mar. 31, 2026

(54) VEHICLE LAMINATED PANE

(71) Applicant: SAINT-GOBAIN GLASS FRANCE, Courbevoie (FR)

(72) Inventors: Stefanie Pengel, Herzogenrath (DE); Roberto Zimmermann, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 161 days.

(21) Appl. No.: 18/569,543

(22) PCT Filed: Aug. 29, 2022

(86) PCT No.: PCT/EP2022/073874
§ 371 (c)(1),
(2) Date: Dec. 12, 2023

(87) PCT Pub. No.: WO2023/031074
PCT Pub. Date: Mar. 9, 2023

(65) Prior Publication Data
US 2024/0383236 A1 Nov. 21, 2024

(30) Foreign Application Priority Data
Aug. 31, 2021 (EP) ..................................... 21193954

(51) Int. Cl.
B60J 1/00 (2006.01)
B23K 26/0622 (2014.01)
(Continued)

(52) U.S. Cl.
CPC .. B32B 17/10449 (2013.01); B32B 17/10036 (2013.01); B32B 17/10201 (2013.01);
(Continued)

(58) Field of Classification Search
CPC ........ B32B 17/10449; B32B 17/10036; B32B 17/10201; B32B 17/10229; B32B 17/10266
(Continued)

(56) References Cited

U.S. PATENT DOCUMENTS

2009/0239017 A1* 9/2009 Ishioka ............. B32B 17/10761
427/163.1
2013/0213949 A1* 8/2013 Lisinski ............ B32B 17/10174
219/203
(Continued)

FOREIGN PATENT DOCUMENTS

CN 101198560 A 6/2008
CN 101808821 A 8/2010
(Continued)

OTHER PUBLICATIONS

Machine_English_translation_DE_202021101982_U1; Gobain; Composite Pane; Apr. 20, 2021; EPO; whole document (Year: 2025).*
(Continued)

*Primary Examiner* — Tahseen Khan
(74) *Attorney, Agent, or Firm* — CUSHMAN PARTNERS

(57) ABSTRACT

A vehicle laminated pane, designed as a combined front and roof pane, has a lower and upper edges and two lateral pane edges includes an outer pane with an outer-side surface and an interior-side surface, an inner pane with an outer-side surface and an interior-side surface, and a thermoplastic intermediate layer which connects the outer pane to the inner pane. The vehicle laminated pane has a first region starting from the lower edge, a third region starting from the upper edge, and a second region which connects the first region and the third region, the interior-side surface of the outer pane has an opaque cover print at least in a peripheral edge region of the vehicle laminated pane, and a sun protection
(Continued)

Figure 1:
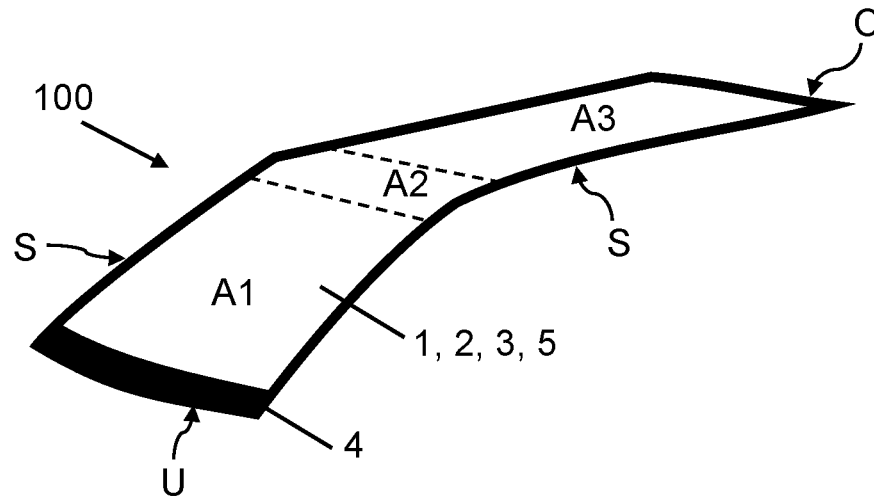

coating is applied to the interior-side surface of the outer pane.

18 Claims, 7 Drawing Sheets

(51) Int. Cl.

| | |
|---|---|
| *B23K 26/402* | (2014.01) |
| *B32B 3/30* | (2006.01) |
| *B32B 17/10* | (2006.01) |
| *B60J 1/02* | (2006.01) |
| *B60J 1/08* | (2006.01) |
| *B60J 1/18* | (2006.01) |
| *B60J 3/00* | (2006.01) |
| *B60J 9/00* | (2006.01) |
| *B60K 35/00* | (2024.01) |

(52) U.S. Cl.

CPC .. *B32B 17/10229* (2013.01); *B32B 17/10266* (2013.01); *B32B 17/10467* (2013.01); *B32B 17/10541* (2013.01); *B32B 17/10651* (2013.01); *B32B 17/10899* (2013.01); *B60J 1/001* (2013.01); *B60J 1/008* (2013.01); *B60J 1/02* (2013.01); *B60J 3/007* (2013.01)

(58) Field of Classification Search

USPC ......................................................... 428/166

See application file for complete search history.

(56) References Cited

U.S. PATENT DOCUMENTS

| | | | | |
|---|---|---|---|---|
| 2014/0254187 | A1* | 9/2014 | Massault ........... | B32B 17/10036 362/511 |
| 2015/0016132 | A1* | 1/2015 | Verrat-Debailleul ........................ | B32B 17/10036 362/509 |
| 2020/0384739 | A1* | 12/2020 | Hagen ............... | B32B 17/10495 |
| 2021/0170724 | A1* | 6/2021 | Hennion ........... | B32B 17/10541 |
| 2021/0237403 | A1* | 8/2021 | Klein ............... | B32B 17/10036 |
| 2022/0032741 | A1* | 2/2022 | Yeh .................... | B23K 26/0624 |

FOREIGN PATENT DOCUMENTS

| | | | | | |
|---|---|---|---|---|---|
| CN | 106687317 | A | | 5/2017 | |
| CN | 107709265 | A | | 2/2018 | |
| CN | 110121414 | A | | 8/2019 | |
| CN | 110650844 | A | | 1/2020 | |
| CN | 110958954 | A | | 4/2020 | |
| CN | 111433023 | A | | 7/2020 | |
| DE | 199 27 683 | C1 | | 1/2001 | |
| DE | 10 2008 026339 | A1 | | 12/2009 | |
| DE | 20 2020 106489 | U1 | | 12/2020 | |
| DE | 202021101982 | U1 | * | 4/2021 | ....... B32B 17/10229 |
| EP | 0 876 608 | B1 | | 4/2002 | |
| EP | 3 157 774 | B1 | | 4/2021 | |
| WO | WO 2011/033313 | A1 | | 3/2011 | |
| WO | WO 2013/127563 | A1 | | 9/2013 | |
| WO | WO 2013/131667 | A1 | | 9/2013 | |
| WO | WO 2014/133929 | A2 | | 9/2014 | |
| WO | WO 2019/110172 | A1 | | 6/2019 | |
| WO | WO 2020/094422 | A1 | | 5/2020 | |
| WO | WO 2020/094423 | A1 | | 5/2020 | |
| WO | WO 2021/180544 | A1 | | 9/2021 | |
| WO | WO 2022/112231 | A1 | | 6/2022 | |
| WO | WO 2022/136107 | A1 | | 6/2022 | |

OTHER PUBLICATIONS

International Search Report as issued in International Patent Application No. PCT/EP2022/073874, dated Oct. 12, 2022.

KR First Office Action as issued in Chinese Patent Application No. 202280004378.1, dated Nov. 13, 2025.

\* cited by examiner

100

100

100

100
A1    A2    A3
1
4
3
2
6
4    5    IV    4    III    II    I
Fig. 16
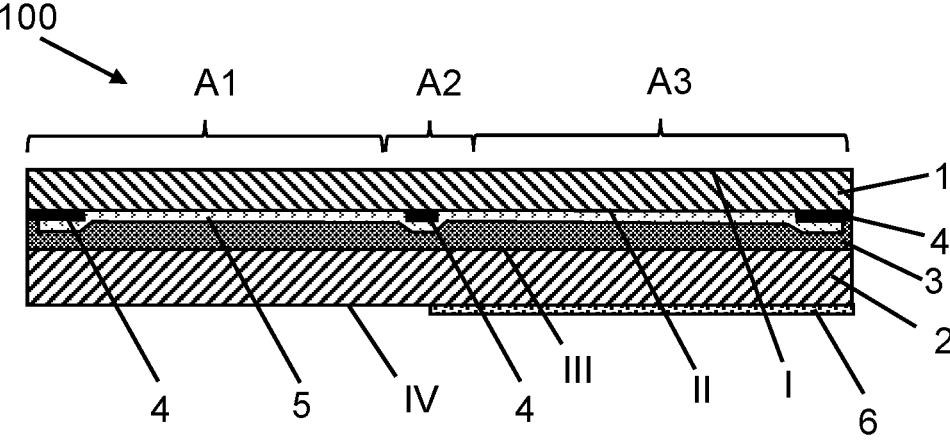
II
M1
Ag1
B1
M2
Ag2
B2
M3
Ag3
B3
M4
1
5
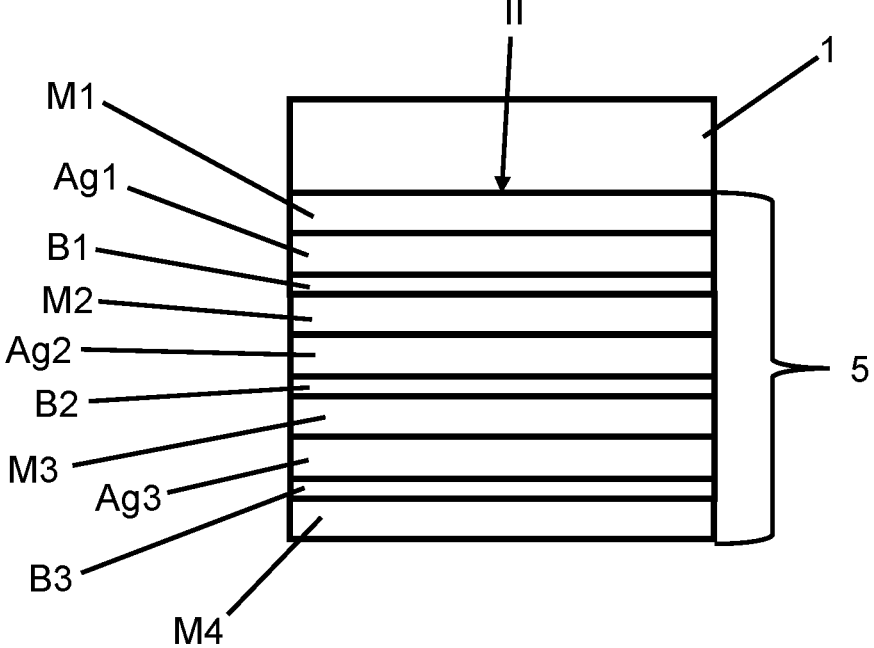
Fig. 17

VEHICLE LAMINATED PANE

CROSS-REFERENCE TO RELATED APPLICATIONS

This application is the U.S. National Stage of PCT/EP2022/073874, filed Aug. 29, 2022, which in turn claims priority to European patent application number 21193954.1 filed Aug. 31, 2021. The content of these applications are incorporated herein by reference in their entireties.

The invention relates to a vehicle laminated pane designed as a combined front and roof pane, in particular a combined windshield and roof pane for a passenger car, with a sun protection coating and a homogeneous overall aesthetic impression, as well as the use thereof.

The interior of a vehicle can heat up strongly in summer at high ambient temperatures and under intense direct solar radiation. In order to achieve thermal comfort for passengers, panes of the vehicle can be provided with a coating which reflects parts of the solar radiation, in particular infrared radiation, and can thus reduce the heating of the vehicle interior.

DE 19927683 C1 discloses a laminated pane which has at least two glass panes with a transparent intermediate layer that connects them and is furthermore provided with a sun protection layer which is substantially reflective of rays outside the visible spectrum of the solar radiation, in particular infrared rays, wherein the laminated glass pane is additionally provided on its surface facing an interior space with a further, transparent coating which is spatially separated from the sun protection layer and which is substantially reflective of heat rays (also referred to as a Low-E layer).

WO 2013/127563 A1 discloses a laminated pane with a sun protection layer between the glass panes and a Low-E coating on the interior-side surface. The heat-ray-reflecting coating (Low-E coating) is formed on the basis of niobium, tantalum, molybdenum or zirconium.

Further laminated panes with sun protection coatings are disclosed in WO 2022/112231 A1 and WO 2021/180544 A1.

Panoramic panes, in particular panoramic windshields, which are extended in the direction of the roof as compared to normal standard windshields and allow an extended view for vehicle occupants, are becoming increasingly popular in vehicle construction. Such panoramic panes are designed to be comparatively large due to the expanded pane and viewing region. Vehicles with panoramic panes often also have a comparatively large roof pane, which is installed closely or directly adjacently to the panoramic windshield.

The reflection colors of the panoramic windshield and of the roof pane, in particular when they have sun protection coatings, appear in different colors for the viewer, particularly due to the different viewing angles, which leads to an inhomogeneous overall aesthetic impression.

EP 3 157 774 B1 discloses a vehicle glazing which comprises a windshield of which the upper edge extends in such a way that it provides a driver with an extended vertical viewing angle, as described in SAE Standard J903 of 1999, of at least 45 degrees, wherein the windshield has two glass layers and an electrical shade integrated in between. The windshield disclosed in EP 3 157 774 B1 can also include the entire roof and even the rear window. Here, it is possible for wires, transparent conductive films or other forms of resistance heating, infrared reflecting coatings and films, reflective coatings and films, photochromic coatings and films, tinted compositions and intermediate layers as well as heat-absorbing, safety and stiffening intermediate layers to also be integrated in the vehicle glazing.

The object of the present invention is to provide an improved vehicle laminated pane with a sun protection coating, wherein a visually pleasing reflection color that is as independent as possible from the viewing angle is to be achieved.

According to the invention, this object is achieved by a vehicle laminated pane according to independent claim 1. Advantageous embodiments of the invention emerge from the dependent claims.

The vehicle laminated pane according to the invention is designed as a combined front and roof pane, has a lower edge, an upper edge and two lateral pane edges, and comprises an outer pane with an outer-side surface and an interior-side surface, an inner pane with an outer-side surface and an interior-side surface, and a thermoplastic intermediate layer which connects the outer pane to the inner pane, wherein the vehicle laminated pane has a first region A1 starting from the lower edge, a third region A3 starting from the upper edge and a second region A2 which directly adjoins the first region A1 and the third region A3 and connects the first region A1 and the third region A3.

According to the invention, the interior-side surface of the outer pane has an opaque cover print at least in a peripheral edge region of the vehicle laminated pane, and a sun protection coating is applied to the interior-side surface of the outer pane and substantially reflects or absorbs rays outside the visible spectrum of the solar radiation, in particular infrared rays.

The thermoplastic intermediate layer is preferably tinted or colored at least in the third region.

As described above, the vehicle laminated pane has a first region A1 starting from the lower edge, a third region A3 starting from the upper edge, and a second region A2 which directly adjoins the first region A1 and the third region A3 and connects the first region A1 and the third region A3. It is understood that the first region extends from the lower edge in the direction of the upper edge, the third region extends from the upper edge in the direction of the lower edge, and the second region connects the first region to the third region.

According to the CIELab color model, each color in the color space is defined by a color point with the Cartesian coordinates $\{L^*, a^*, b^*\}$. The $a^*b^*$ coordinate plane was constructed under application of the counter-color theory. Green and red are situated on the $a^*$ axis; the $b^*$ axis runs between blue and yellow. Complementary hues are each located 180° opposite one another; at their center (the coordinate origin $a^*=0$, $b^*=0$) is gray.

The $L^*$ axis describes the brightness (luminance) of the color with values from 0 to 100. In the illustration, this is perpendicular to the $a^*b^*$ plane at the zero point. It can also be referred to as the neutral gray axis, because all achromatic colors (gray shades) are contained between the end points black ($L^*=0$) and white ($L^*=100$). The $a^*$ axis describes the green or red component of a color, wherein negative values represent green and positive values represent red. The $b^*$ axis describes the blue or yellow component of a color, wherein negative values represent blue and positive values represent yellow.

The vehicle laminated pane according to the invention has a reflection color in reflection at an angle of 60°, the $a^*$ color coordinate of which has a negative value in the CIE color space, and the $b^*$ color coordinate of which has a negative value in the CIE color space. In addition, the vehicle laminated pane according to the invention has a reflection color in reflection at an angle of 8°, the a* color coordinate of which has a negative value in the CIE color space, and the b* color coordinate of which has a negative value in the CIE color space.

Both the a* color coordinate and the b* color coordinate of the reflection at an angle of 8° or of 60° are thus in each case smaller than zero in the vehicle laminated pane according to the invention. The reflection color of the vehicle laminated pane according to the invention is consequently neutral to blue/greenish.

Preferably, for the a* color coordinate and the b* color coordinate of the reflection at an angle of 8° or 60° in the vehicle laminated pane according to the invention, are −20<a*<0 and −15<b*<0.

In a preferred embodiment, the value of b* is greater than the value of a*, so that the reflection appears more blue and less greenish.

The vehicle laminated pane comprises, as described above, an outer pane and an inner pane, which are connected to one another via a thermoplastic intermediate layer. The vehicle laminated pane is provided for separating the interior from the external environment in a window opening, in particular the window opening of a vehicle. In the sense of the invention, the term "inner pane" refers to the pane of the vehicle laminated pane facing the vehicle interior. Outer pane means the pane facing the external environment.

The vehicle laminated pane has, as described above, an upper edge and a lower edge and two side edges extending between them. Upper edge means the edge intended to point rearward/upward in the installed position. Lower edge means the edge intended to point downward in the installed position. In the case of the vehicle laminated pane designed as a combined front and roof pane, in the installed position in the vehicle, the upper edge corresponds to the rear roof edge oriented in the direction of the rear window, and the lower edge corresponds to the motor edge. The vehicle laminated pane according to the invention thus extends from the motor edge up to the rear roof edge.

As described above, the outer pane and the inner pane each have an outer-side surface and an interior-side surface. A peripheral side edge extends in between. In the context of the invention, the outer surface means the main surface which is provided to face the external environment when installed. In the context of the invention, the interior-side surface means the main surface which is intended to face the interior space when installed. The interior-side surface of the outer pane and the outer-side surface of the inner pane face one another.

The surfaces of the outer pane and the inner pane are typically designated as follows:

The outer-side surface of the outer pane is designated as side I. The interior-side surface of the outer pane is designated as side II. The outer-side surface of the inner pane is designated as side III. The interior-side surface of the inner pane is designated as side IV.

The sun protection coating is preferably provided as an IR-reflecting coating. In particular, the coating is applied over the entire pane surface with the exception of a peripheral edge region and optionally local regions, which are intended to ensure the transmission of electromagnetic radiation through the laminated pane as communication, sensor or camera windows, and therefore are not provided with the coating. The peripheral uncoated edge region has, for example, a width of up to 20 cm. It prevents direct contact of the coating with the surrounding atmosphere, so that the coating in the interior of the laminated pane is protected against corrosion and damage.

The sun protection coating is to be designed as a transparent coating. A transparent coating is understood to mean a coating which has an average transmittance in the visible spectral range of at least 70%, preferably at least 75%, which therefore does not significantly restrict the view through the pane.

If a first layer is arranged above a second layer, this means, in the sense of the invention, that the first layer is arranged further away from the outer pane than the second layer. If a first layer is arranged below a second layer, this means, in the sense of the invention, that the second layer is arranged further away from the outer pane than the first layer.

If a layer is formed "on the basis of" a material, the layer consists predominantly of this material, in particular substantially of this material, in addition to any impurities or doping.

The sun protection coating is preferably a layer stack or a layer sequence, in particular of thin layers, comprising multiple silver layers, each silver layer being arranged between two dielectric layers or layer sequences. These dielectric layers or layer sequences are referred to as dielectric modules. A dielectric module is therefore understood to mean a dielectric layer which can be formed from a single stratum, that is to say a single dielectric layer, or from multiple strata of dielectric layers. The coating is thus a thin-film stack with n silver layers and (n+1) dielectric layers or layer sequences, wherein n is a natural number, and wherein a silver layer and a dielectric layer or layer sequence in each case alternatingly follows a lower dielectric layer or layer sequence.

The sun protection coating is a thin-film stack, i.e., a layer sequence of thin individual layers, and preferably comprises at least four dielectric modules (M1, M2, M3 and M4), that is to say at least four dielectric layers. Each functional silver layer is arranged between two dielectric layers or layer sequences. The functional layers or layer sequences and the dielectric layers are arranged here in such a way that at least one dielectric layer is arranged between each two adjacent functional silver layers between which no further functional silver layer is arranged, and that at least one further dielectric layer is arranged above the uppermost functional layer, and that at least one further dielectric layer is arranged below the lowermost functional layer.

The sun protection coating preferably has at least three silver layers. The said natural number n is therefore at least 3.

The coating according to the invention can comprise further silver layers and dielectric modules which are arranged above the fourth dielectric Module M4 (n>3). In a particularly preferred embodiment of the vehicle laminated pane according to the invention, however, said natural number n is exactly 3. Beyond the silver layers, however, other metal-containing layers can be present which do not substantially contribute to the sun protection properties of the coating, but rather fulfill another purpose. This applies in particular to metallic blocker layers with geometric thicknesses of less than 1 nm, which are preferably arranged between the silver layer and the dielectric modules.

The silver layers impart the basic IR-reflecting effect to the sun protection coating. The term 'silver layer' is a designation here of a layer formed on the basis of silver. The silver layers are formed on the basis of silver. The silver layers preferably contain at least 90 wt % silver, particularly preferably at least 99 wt % silver, and very particularly preferably at least 99.9 wt % silver. The silver layer can comprise dopants, e.g., palladium, gold, copper, or aluminum.

In a preferred embodiment of the vehicle laminated pane according to the invention, the sun protection coating comprises the following layer sequence as considered from the direction of the outer pane first dielectric module (M1),
first silver layer (Ag1),
second dielectric module (M2),
second silver layer (Ag2),
third dielectric module (M3),
third silver layer (Ag3),
fourth dielectric module (M4).

The structure of the layer sequence of the sun protection coating is viewed from the direction of the outer pane. This means that the first dielectric module is the layer of the sun protection coating closest to the interior-side surface of the outer pane, and, in this order, the first silver layer (Ag1), the second dielectric module (M2), the second silver layer (Ag2), the third dielectric module (M3), the third silver layer (Ag3) and the fourth dielectric module (M4) follow. The fourth dielectric module is thus the layer of the sun protection coating furthest from the interior-side surface of the outer pane and closest to the outer-side surface of the inner pane. The silver layers are each arranged between dielectric modules, i.e., dielectric layers or layer sequences.

In a particularly preferred embodiment of the vehicle laminated pane according to the invention, the silver layers (Ag1, Ag2, Ag3) of the sun protection coating have a relative geometric layer thickness in relation to each other of 0.4<Ag1/Ag3<1.7, wherein Ag3 or Ag2 is the silver layer with the greatest thickness, and wherein the thickness of silver layers Ag3 and Ag2 can also be the same. The dielectric modules (M1, M2, M3, M4) have a relative optical layer thickness of M2/M1≥1.9, M2/M3≥0.8 and M2/M4≥1.6.

In an alternative particularly preferred embodiment the silver layers (Ag1, Ag2, Ag3) of the sun protection coating according to the invention have a relative geometric layer thickness in relation to each other of Ag1/Ag2>1 and Ag1/Ag3>1, and the dielectric modules (M1, M2, M3, M4) have a relative optical layer thickness in relation to each other of M2/M1>1, M2/M3>1, and M2/M4>1.

According to the invention, a vehicle laminated pane is thus also designed as a combined front and roof pane, with a lower edge and an upper edge and two lateral pane edges at least comprising an outer pane with an outer-side surface and an interior-side surface, an inner pane with an outer-side surface and an interior-side surface and a thermoplastic intermediate layer which connects the outer pane to the inner pane, wherein the vehicle laminated pane has a first region A1 starting from the lower edge, a third region A3 starting from the upper edge and a second region A2 directly adjoining the first region A1 and the third region A3 and connecting the first region A1 and the third region A3, at least in a peripheral edge region of the vehicle laminated pane, the interior-side surface of the outer pane has an opaque cover print, a sun protection coating is applied at least in regions in the third region A3 on the interior-side surface of the outer pane, the thermoplastic intermediate layer is tinted or colored at least in the third region A3, wherein the sun protection coating comprises, starting from the outer pane in the direction of the inner pane, the following layer sequence first dielectric module M1,
first silver layer Ag1,
second dielectric module M2,
second silver layer Ag2,
third dielectric module M3,
third silver layer Ag3,
fourth dielectric module M4, wherein the vehicle laminated pane has a reflection color in reflection at an angle of 60° and a reflection color in reflection at an angle of 8°, the a* color coordinate of each of which has a negative value in the CIE color space and the b* color coordinate of which in each case has a negative value in the CIE color space, and wherein either the silver layers (Ag1, Ag2, Ag3) have a relative geometric layer thickness in relation to each other of 0.4<Ag1/Ag3<1.7 and Ag3 or Ag2 is the thickest silver layer, and die dielectric modules (M1, M2, M3, M4) have a relative optical layer thickness of M2/M1≥1.9, M2/M3≥0.8 and M2/M4≥1.6, or wherein the silver layers (Ag1, Ag2, Ag3) have a relative geometric layer thickness in relation to each other of Ag1/Ag2>1 and Ag1/Ag3>1, and the dielectric modules (M1, M2, M3, M4) have a relative optical layer thickness of M2/M1>1. M2/M3>1 and M2/M4>1.

Surprisingly, it has been found that a vehicle laminated pane with such sun protection coatings has significantly improved energy properties and at the same time good optical and aesthetic properties, in particular with undesired hues in the reflection of the vehicle laminated pane being able to be minimized or even avoided, as compared to the previously known laminated glass panes with sun protection coating. In addition to a visually pleasing reflection color itself, the smallest possible angle-dependent change in the reflection color is also decisive for high customer acceptance. Such a vehicle laminated pane according to the invention shows only a small angular dependence of the reflection color.

In a preferred embodiment of the vehicle laminated pane according to the invention, the first silver layer Ag1 and the third silver layer Ag3 in the sun protection coating have a relative geometric layer thickness in relation to each other of 0.6<Ag1/Ag3<1.7, while the second silver layer Ag2 is the thickest silver layer. The dielectric modules M1, M2, M3 and M4 have a relative optical layer thickness in relation to each other of M2/M1≥2, M2/M3>1 and M2/M4≥2, wherein the second dielectric module M2 is the dielectric module with the greatest layer thickness. This embodiment has proven to be particularly advantageous with regard to a further improved angle-dependent change in the reflection color of the vehicle laminated pane.

The optical thickness is the product of the geometric thickness and the refractive index (at 550 nm). The optical thickness of a layer sequence is calculated as the sum of the optical thicknesses of the individual layers. The refractive index can be determined, for example, by ellipsometry. Ellipsometers are commercially available—for example, from the Sentech company. The refractive index of a dielectric layer is preferably determined by first depositing it as a single layer on a substrate and subsequently measuring the refractive index by means of ellipsometry. To determine the refractive index of a dielectric layer sequence, the layers of the layer sequence are each deposited alone as individual layers on a substrate and then the refractive index is determined by means of ellipsometry.

In a further preferred embodiment of the vehicle laminated pane according to the invention, the third silver layer is the silver layer with the greatest layer thickness in the sun protection coating, wherein the first silver layer Ag1, the second silver layer Ag2 and the third silver layer Ag3 have a relative geometric layer thickness in relation to each other of $0.4<Ag1/Ag3<0.9$ and $0.5<Ag2/Ag3<1.0$. The first dielectric module M1, the second dielectric module M2, the third dielectric module M3 and the fourth dielectric module M4 have a relative optical layer thickness in relation to each other of $M2/M1\geq1.9$, $M2/M3\geq0.8$ and $M2/M4\geq1.6$. A vehicle laminated pane with this embodiment of the sun protection coating shows a further improved energy reflection.

In one embodiment of the invention, all dielectric layers have a refractive index greater than 1.8, preferably greater than 1.9. In other words, all dielectric layers or layer sequences of the dielectric modules are formed exclusively from dielectric layers having a refractive index of greater than 1.8. This achieves good results. The dielectric layers can, for example, be formed on the basis of silicon nitride, silicon-metal mixed nitrides (such as silicon zirconium nitride (SiZrN), silicon-aluminum mixed nitride, silicon-hafnium mixed nitride or silicon-titanium mixed nitride), aluminum nitride (AlN), tin oxide (SnO), manganese oxide (MnO), tungsten oxide ($WO_3$), niobium oxide ($Nb_2O_5$), bismuth oxide ($Bi_2O_3$), titanium dioxide ($TiO_2$), zinc oxide (ZnO) or tin-zinc mixed oxide (SnZnO).

In the context of the present invention, refractive indices are in all cases specified in relation to a wavelength of 550 nm. The materials mentioned in the present description can be deposited stoichiometrically, substoichiometrically or superstoichiometrically. The materials can comprise dopants, in particular aluminum, boron, zirconium or titanium. Due to the dopants, dielectric materials can be provided with a certain electrical conductivity. A person skilled in the art will nevertheless identify them as dielectric layers in terms of their function, as is customary in the field of thin layers. The material of the dielectric layers preferably has an electrical conductivity (reciprocal of the specific resistance) of less than $10^{-4}$ S/m. The material of the silver layers preferably has an electrical conductivity of greater than $10^4$ S/m.

The first dielectric module, the second dielectric module, the third dielectric module and/or the fourth dielectric module preferably contain a dielectric layer acting as an anti-reflection layer. In an advantageous embodiment, each dielectric module contains a dielectric layer as an anti-reflection layer. The anti-reflective layers reduce the reflection of visible light and therefore increase the transparency of the coated pane. The anti-reflection layers are formed, for example, on the basis of silicon nitride ($Si_3N_4$), silicon oxide ($SiO_2$), silicon oxynitrides, silicon-metal mixed nitrides such as silicon zirconium nitride (SiZrN), aluminum nitride (AlN) or tin oxide (SnO). The anti-reflective layers can moreover have dopants. The anti-reflection layers preferably have geometric thicknesses of 5 nm to 100 nm, particularly preferably 10 nm to 60 nm.

In an advantageous embodiment, one or more dielectric layer modules have a first adaptation layer, preferably at least each dielectric module which is arranged below a silver layer. The first adaptation layer is preferably arranged above the anti-reflection layer. The first adaptation layer is preferably arranged directly below the first silver layer, so that it has direct contact with the respective silver layer. This is particularly advantageous with regard to the crystallinity of the silver layer. In an advantageous embodiment, one or more dielectric modules have a second adaptation layer, preferably each dielectric layer sequence arranged above a silver layer. The second adaptation layer is preferably arranged below the anti-reflection layer.

The first adaptation layer and/or the second adaptation layer preferably contains zinc oxide ZnO. The first adaptation layer and/or the second adaptation layer also preferably contain dopants. The first adaptation layer and/or the second adaptation layer can contain aluminum-doped zinc oxide (ZnO:Al), for example. The zinc oxide is preferably deposited substoichiometrically with respect to the oxygen in order to avoid a reaction of excess oxygen with the silver-containing layer. The geometric layer thicknesses of the first adaptation layer and the second adaptation layer are preferably from 5 nm to 20 nm, particularly preferably from 8 nm to 20 nm.

The sun protection coating can comprise further layers known per se to a person skilled in the art, for example smoothing layers, sacrificial layers, barrier layers and/or blocker layers.

In an advantageous embodiment, one or more dielectric modules have at least one dielectric layer as smoothing layer, preferably each dielectric module arranged between two silver layers, particularly preferably additionally also the lowermost first dielectric module. The at least one smoothing layer is arranged below the first adaptation layers, preferably between the anti-reflection layer and the first adaptation layer, if such a first adaptation layer is present. The smoothing layer is particularly preferably in direct contact with the first adaptation layer. The smoothing layer yields an optimization, in particular smoothing of the surface for a silver layer subsequently applied above. A silver layer deposited on a smoother surface has a higher transmittance with a simultaneously lower sheet resistance. The geometric layer thickness of a smoothing layer is preferably from 5 nm to 20 nm, particularly preferably from 5 nm to 12 nm. The smoothing layer preferably has a refractive index of less than 2.2.

The smoothing layer preferably contains at least one non-crystalline oxide. The oxide may be amorphous or partially amorphous (and therefore partially crystalline), but is not completely crystalline. The non-crystalline smoothing layer has a low roughness and therefore forms an advantageously smooth surface for the layers to be applied above the smoothing layer. The non-crystalline smoothing layer also effects an improved surface structure of the layer, which is preferably the first adaptation layer, deposited directly above the smoothing layer. The smoothing layer can contain, for example, at least one oxide of one or more of the elements tin, silicon, titanium, zirconium, hafnium, zinc, gallium and indium. The smoothing layer particularly preferably contains a non-crystalline mixed oxide. The smoothing layer particularly preferably contains a tin/zinc mixed oxide (ZnSnO). The mixed oxide can have dopants. The smoothing layer can contain, for example, an antimony-doped tin/zinc mixed oxide. The mixed oxide preferably has a sub-stoichiometric oxygen content.

In an advantageous embodiment, the sun protection coating comprises one or more blocker layers. At least one silver layer, particularly preferably each silver layer, is preferably associated with at least one blocker layer. The blocker layer is preferably in direct contact with the silver layer and is arranged directly above or directly below the silver layer. There is therefore preferably no further layer arranged between the silver layer and the associated blocker layer. A blocker layer can also be arranged directly above and directly below a silver layer. The blocker layer preferably contains niobium, titanium, nickel, chromium and/or alloys thereof, particularly preferably nickel-chromium alloys. The geometric layer thickness of the blocker layer is preferably from 0.1 nm to 3 nm, particularly preferably from 0.1 nm to 1.5 nm, very particularly preferably from 0.1 nm to 1.0 nm. A blocker layer directly below a silver layer serves in particular for stabilizing the silver layer during a temperature treatment and improves the optical quality of the sun protection coating. A blocker layer directly above the silver layer prevents contact of the sensitive silver layer with the oxidizing reactive atmosphere during the deposition of the following layer by reactive cathode sputtering, for example of the second adaptation layer.

In an advantageous embodiment, between two adjacent silver layers there is arranged in each case a dielectric module comprising the following dielectric layer sequence:

- an anti-reflection layer on the basis of silicon nitride, silicon-metal mixed nitrides such as silicon zirconium nitride, aluminum nitride and/or tin oxide,
- a smoothing layer on the basis of an oxide of one or more of the elements tin, silicon, titanium, zirconium, hafnium, zinc, gallium and indium,
- a first and a second adaptation layer on the basis of zinc oxide, and
- optionally a blocker layer on the basis of niobium, titanium, nickel, chromium and/or alloys thereof. A specific sequence of the layers is not assumed here.

Below the lowermost silver layer and above the uppermost silver layer, there is preferably arranged an anti-reflection coating and an adaptation layer on the basis of the aforementioned preferred materials.

The dielectric modules preferably have a geometric thickness from 10 nm to 100 nm, particularly preferably from 20 nm to 90 nm, in particular between 70 nm and 85 nm. The geometric thickness of the dielectric modules results in the optical thickness of the modules by multiplication with the refractive index of the respective layers. The optical thickness of the dielectric modules is between 40 nm and 240 nm, preferably between 50 nm and 200 nm.

The geometric thickness of each functional silver layer of the sun protection coating is preferably from 5 nm to 25 nm, particularly preferably from 8 nm to 20 nm. The geometric total layer thickness of all functional silver layers of the sun protection coating is preferably from 20 nm to 80 nm, particularly preferably from 30 nm to 60 nm. In these ranges for the thickness of the functional layer and the total thickness of all functional silver layers, particularly good results with regard to the sun protection function and the transparency are achieved.

The sun protection coating has IR-reflecting properties, so that it functions as a sun protection coating, which reduces the heating of the vehicle interior by reflection of the thermal radiation. The TTS value of the vehicle laminated pane provided with the coating is preferably less than 50%, particularly preferably less than 45%, very particularly preferably less than 40%. The TTS value refers to the total transmitted solar energy, measured according to ISO 13837—it is a measure of thermal comfort. The coating can also be used as a heating coating when it is electrically contacted, so that a current flows through it, which heats the coating.

The outer pane and the inner pane are preferably made of glass, in particular of soda-lime glass, which is customary for window panes. In principle, however, the panes can also be produced from other types of glass (for example borosilicate glass, quartz glass, aluminosilicate glass) or transparent plastics (for example polymethyl methacrylate or polycarbonate). The thickness of the outer pane and the inner pane can vary widely. Preferably, panes having a thickness in the range from 0.8 mm to 5 mm, preferably from 1.4 mm to 2.9 mm, are used, for example those with the standard thicknesses of 1.6 mm or 2.1 mm.

The outer pane and the inner pane can be clear and colorless, but also tinted or colored. As described above, the first region of the vehicle laminated pane corresponds, in the installation position, to a windshield, so that a high transmission in the visible region of the light spectrum is desired therein and dark tones of the components are spared. In one embodiment, the total transmission through the composite glass in the first region is greater than 70% based on light type A. The term 'total transmission' relates to the method defined by ECE-R 43, Annex 3, Section 9.1 for testing the light transmission of motor vehicle panes. Independently of each other the outer pane and the inner panes can be not prestressed, partially prestressed or prestressed. If at least one of the panes should be prestressed, this can be thermal or chemical prestressing.

Suitable glass panes comprise, for example, glass panes which are known under the trade names Planiclear and Planilux (both clear glass) by SAINT-GOBAIN. In order to further improve the transparency TL of the laminated pane in the visible range of the light, glass panes with particularly high transparency can also be used.

The vehicle laminated pane is curved in one or more spatial directions, as is usual for motor vehicle panes, wherein typical radii of curvature are in a range of approximately 10 cm to approximately 40 m. Consequently, the outer pane and the inner pane are also curved in one or more spatial directions.

The thermoplastic intermediate layer is formed by one or more thermoplastic films, wherein the individual films in the resulting intermediate layer can no longer be distinguished from one another in the resulting vehicle laminated pane.

The thermoplastic intermediate layer comprises at least one thermoplastic polymer, preferably ethylene vinyl acetate (EVA), polyvinyl butyral (PVB) or polyurethane (PU), or mixtures, or copolymers, or derivatives thereof, particularly preferably PVB. The thickness of the intermediate layer is preferably from 0.2 mm to 2 mm, particularly preferably from 0.3 mm to 1 mm. The thermoplastic intermediate layer may comprise one or more polymer films. The individual polymer films of the thermoplastic intermediate layer preferably have a thickness of approximately 0.2 mm to 1 mm, for example 0.38 mm, 0.76 mm or 0.81 mm. Further properties of the vehicle laminated pane can be influenced by the thickness of the films. For instance, thicker films cause improved sound damping, in particular when they contain an acoustically effective core, an increased intrusion resistance of the vehicle laminated pane and also an increased protection against ultraviolet radiation (UV protection).

The sun protection coating is applied, according to the invention, to the interior-side surface of the outer pane. In this way, the sun protection coating is protected from weather influences in the laminate of the vehicle laminated pane. Positioning of the sun protection coating on the interior-side surface of the outer pane, i.e., as close as possible to the outer side of the outer pane, is advantageous with regard to a particularly good sun protection effect. This is further optimized by using a clear, non-tinted outer pane.

In a preferred embodiment, the vehicle laminated pane on the interior-side surface of the inner pane can have, at least in the third region, a heat-ray reflecting coating, which reduces the heat transmission. If the thermoplastic intermediate layer is also dark-colored or -tinted in a region in which the vehicle laminated pane has the heat-ray-reflecting coating, the vehicle laminated pane can then have a particularly low total transmitted thermal radiation (TTS) of less than 14% (measured according to ISO13837) in this region, wherein, at the same time, an optimal aesthetic appearance can be achieved without undesired hues in the reflection of the vehicle laminated pane. In particular, undesired red and yellow reflections or cloudiness of the vehicle laminated pane can be avoided. If the thermoplastic intermediate layer is colorless in a region in which the vehicle laminated pane has the heat-ray-reflecting coating, the vehicle laminated pane can then have a low total transmitted thermal radiation (TTS) of less than 45%, preferably less than 42% (measured according to ISO13837) in this region, wherein, at the same time, an optimal aesthetic appearance can be achieved without undesired hues in the reflection of the vehicle laminated pane. In particular, undesired red and yellow reflections or cloudiness of the vehicle laminated pane can be avoided.

Such heat-ray-reflecting coatings are known, for example, from WO 2013/131667 A1 or WO 2019/110172 A1. The heat-ray-reflecting coating can also be referred to as a heat protection coating, a low emissivity coating, an emissivity-reducing coating, Low-E coating or Low-E layer. It has the task of reflecting thermal radiation, i.e., in particular IR radiation, which is longer in respect of the wavelength than the IR component of solar radiation. At low outside temperatures, the Low-E coating reflects heat back into interior and reduces the cooling of the interior. At high outside temperatures, in addition to the sun protection coating, the Low-E coating reflects the thermal radiation of the heated vehicle laminated pane outwards and reduces the heating of the interior. Together with the sun protection coating, the Low-E coating particularly effectively reduces the emission of heat radiation of the pane into the interior space in summer and the emission of heat into the external environment in winter.

The heat-ray-reflecting coating preferably comprises a functional layer which comprises a conductive oxide (also referred to as transparent conductive oxides or TCO), preferably indium tin oxide (ITO), or tin oxide ($SnO_2$) which are arranged between dielectric layers. The dielectric layers can be formed, in particular, from dielectric oxides or nitrides, such as ZnO, SnZnO, AlN, $TiO_2$, $SiO_2$ or $Si_3N_4$.

However, the functional layer of the heat-ray-reflecting coating can also contain other electrically conductive oxides, for example fluorine-doped tin oxide ($SnO_2$:F), antimony-doped tin oxide ($SnO_2$:Sb), indium-zinc mixed oxide (IZO), gallium-doped or aluminum-doped zinc oxide, niobium doped titanium oxide, cadmium stannate and/or zinc stannate. Particularly good results with regard to emissivity and bending capability of this coating are thus achieved.

In one embodiment of the invention, the heat-ray-reflecting coating has an emissivity of at most 50%, preferably at most 30%. Interior-side emissivity in this context is the measure that indicates how much heat radiation the pane emits by the heat-ray-reflecting coating into an interior, for example of a building or of a vehicle, in the installed position compared to an ideal heat emitter (a black body). In the sense of the invention, emissivity is understood to mean the normal emissivity at 283 K according to the standard EN 12898.

The vehicle laminated pane preferably has an external energy reflection RE>36%, preferably RE>39%. The energy value RE is calculated according to the standard ISO 9050.

In one embodiment of the vehicle laminated pane according to the invention, it has an outer-side reflectivity (visible external reflection $RL_{ext}$) from $RL_{ext}$>8%, preferably between 10% and 22%, when using a standard A radiator at an angle of incidence of 2°. A calculation of the optical value $RL_{ext}$ is performed in accordance with the standard EN 410 with light type A. An outer-side reflectivity describes here the reflected portion of the visible radiation incident from the external environment.

As explained above, the thermoplastic intermediate layer can be tinted or colored at least in the third region. In a preferred embodiment, the thermoplastic intermediate layer is tinted or colored not only in the third region but also in the second region, wherein preferably in the second region the dye concentration in the thermoplastic intermediate layer decreases in the direction of the first region. The thermoplastic intermediate layer thus preferably has a color gradient in this embodiment.

As described above, the interior-side surface of the outer pane has an opaque cover print at least in a peripheral edge region of the vehicle laminated pane. In addition to the opaque cover print in the peripheral edge region, the vehicle laminated pane can also have an opaque cover print in a region lying in the second region. This cover print present in a region of the second region is optionally widened in at least one region into the first region and can optionally have at least one recess for a sensor window.

The thermoplastic intermediate layer can be formed in one piece or composed of multiple pieces which are welded to one another.

In one embodiment of the vehicle laminated pane according to the invention, the vehicle laminated pane additionally has an opaque cover print in a region lying in the second region, and the thermoplastic intermediate layer is composed of two pieces, which are welded together at a weld seam, wherein the weld seam is arranged in exactly the region of the second region in which the opaque cover print is arranged when looking through perpendicularly from the outside. In this way, the weld seam is covered by the opaque cover print when looking perpendicularly from the outside.

The opaque cover print can be designed, for example, as an opaque enamel or as an opaque lacquer. Suitable enamels or lacquers are known to a person skilled in the art.

The opaque cover print preferably contains at least one pigment and glass frits. It can contain other chemical compounds. The glass frits can be melted or fused and the cover print can thus be permanently connected (fused or sintered) to the glass surface. The pigment provides the opacity of the cover print. Such cover prints are typically applied as enamel.

The printing ink from which the opaque cover print is formed in the form of an enamel preferably contains at least the pigment and the glass frits, suspended in a liquid phase (solvent), for example water or organic solvents such as alcohols. The pigment is typically a black pigment, such as pigment carbon black, aniline black, bone black, iron oxide black, spinel black and/or graphite.

In one embodiment of the vehicle laminated pane according to the invention, the opaque cover print is formed from a printing ink which has decomposing properties relative to the sun protection coating.

The decomposing properties of the printing ink relative to the sun protection coating can be achieved, for example, by the suitable choice of the glass frits. These are preferably formed on the basis of bismuth-zinc-borate. In order to achieve the decomposing properties, the bismuth fraction and/or the boron fraction is preferably higher than in conventional glass frits. For example, the decomposing cover print which is known from WO 2014/133929 A2 can also be used.

The vehicle laminated pane according to the invention can additionally comprise a switchable functional element and/ or at least one lighting element. The additional switchable functional element and/or the at least one illumination element is preferably arranged in the third region of the vehicle laminated pane according to the invention.

An example of such functional elements is constituted by SPD functional elements (SPD=suspended particle device), which are known, for example, from EP 0876608 B1 and WO 2011033313 A1. By applying voltage, the transmission of visible light can be controlled by SPD functional elements.

Another example is PDLC functional elements (PDLC=polymer-dispersed liquid crystal), which are known, for example, from DE 102008026339 A1. The active layer contains liquid crystals which are embedded in a polymer matrix. If no voltage is applied, the liquid crystals will be aligned in an unordered manner, which results in strong scattering of the light passing through the active layer. If a voltage is applied to the planar electrodes, the liquid crystals will align in a common direction and the transmission of light through the active layer is increased.

Another example is PNLC functional elements (PNLC=polymer network liquid crystal). The active layer contains liquid crystals which are embedded in a polymer network, the mode of operation otherwise being analogous to the PDLC functional elements.

Another example is electrochromic functional elements.

SPD, PDLC and PNLC functional elements and electrochromic functional elements are commercially available as functional elements.

Examples of illumination elements are, for example, LED lighting means (LED=light-emitting diodes) or OLED lighting means (OLED=organic light-emitting diodes) or light-scattering optical fibers. Suitable lighting means for installation in the vehicle laminated pane according to the invention are known to a person skilled in the art. It is also possible to couple light into the laminated pane via an edge of the vehicle laminated pane and then to decouple it again, for example, via holes in the inner pane of the laminated pane. Glazing having at least one pane and a light source for coupling light into the pane is disclosed in WO 2022/136107 A1.

The invention further comprises a method for producing a vehicle laminated pane according to the invention as a combined front and roof pane with a lower edge and an upper edge and two lateral pane edges, which comprises the following method steps:

a) providing an outer pane with an outer-side surface and an interior-side surface, an inner pane with an outer-side surface and an interior-side surface, and a thermoplastic intermediate layer;

b) applying an opaque cover print to the interior-side surface of the outer pane at least in a peripheral edge region and applying a sun protection coating to the interior-side surface of the outer pane;

c) forming a layer stack at least comprising, in this order, outer pane, thermoplastic intermediate layer and inner pane; and d) connecting the layer stack formed of at least outer pane, thermoplastic intermediate layer and inner pane to form the vehicle laminated pane.

In a preferred embodiment of the method according to the invention, in step b) the opaque cover print is first applied and then the sun protection coating is applied. In this embodiment, the sun protection coating is thus applied in the region in which no opaque cover print is present on the interior-side surface of the outer pane and moreover at least partially on the opaque cover print.

In an alternative preferred embodiment of the method according to the invention, in step b) the sun protection coating is applied first and then the opaque cover print, wherein the opaque cover print is formed from a printing ink which has decomposing properties relative to the sun protection coating. In this embodiment, the sun protection coating is thus applied only in the region in which no opaque cover print is present on the interior-side surface of the outer pane.

In a preferred embodiment of the method, the application of a heat-ray-reflecting coating to the interior-side surface of the inner pane at least in the third region is provided as a further step. The heat-ray-reflective coating can also be applied to the entire interior-side surface of the inner pane.

To produce a vehicle laminated pane according to the invention with a heat-ray-reflecting coating on the interior-side surface of the interior-side surface of the inner pane only in the third region, either the heat-ray-reflecting coating can be applied to the entire interior-side surface of the inner pane and then removed by means of a laser in the first and second regions, or, before applying the heat-ray-reflecting coating to the interior-side surface of the inner pane, the interior-side surface of the inner pane is masked in the first and second regions by means of a masking agent, the heat-ray-reflecting coating is applied, and the masking agent is subsequently removed.

Both the sun protection coating and the optional heat-ray-reflecting coating are thermally highly loadable, so that they also withstand a temperature treatment or bending of the panes at temperatures of typically more than 600° C. without damage.

The individual layers of the sun protection coating and the optional heat-ray-reflecting coating can be deposited by methods known per se, preferably by magnetic-field-assisted sputtering, and can be built up in the suitable layer thicknesses and layer sequences. Sputtering can take place in an inert gas atmosphere, for example formed of argon, or in a reactive gas atmosphere, for example by adding oxygen or nitrogen. However, the individual layers can also be applied by other suitable methods known to a person skilled in the art, for example vapor deposition or chemical vapor deposition.

The outer pane and inner pane are connected via the thermoplastic intermediate layer to form the vehicle laminated pane, preferably by lamination under the effect of heat, vacuum and/or pressure. Methods known per se for producing a laminated pane can be used.

For example, so-called autoclave methods can be carried out at an elevated pressure of approximately 10 bar to 15 bar and at temperatures of 130° C. to 145° C. for approximately 2 hours. Vacuum bag or vacuum ring methods known per se operate, for example, at approximately 200 mbar and 80° C. to 110° C. The outer pane, the thermoplastic intermediate layer, and the inner pane can also be pressed in a calender between at least one pair of rollers to form a pane. Systems of this type are known for producing panes and normally have at least one heating tunnel upstream of a pressing unit. The temperature during pressing is, for example, from 40° C. to 150° C. Combinations of calender and autoclave methods have proven particularly successful in practice. Vacuum laminators can be used as an alternative. These consist of one or more heatable and evacuable chambers, in which the panes are laminated within, for example, approximately 60 minutes at reduced pressures of 0.01 mbar to 800 mbar and temperatures from 80° C. to 170° C.

The above-described preferred embodiments of the vehicle laminated pane according to the invention also apply accordingly to methods for producing a vehicle laminated pane according to the invention, and vice versa.

The invention further comprises the use of the vehicle laminated pane according to the invention as a combined front and roof pane in transportation means for traffic on land, in the air or in water, preferably as a combined front and roof pane in rail vehicles or motor vehicles, in particular as a combined windshield and roof pane of passenger cars.

All the standards mentioned relate to their version valid as on the filing date of the invention.

The various embodiments of the invention may be implemented individually or in any combinations. In particular, the features mentioned above and yet to be explained below can be used not only in the specified combinations but also in other combinations or alone without departing from the scope of the present invention. That is the case unless exemplary embodiments and/or their features are explicitly mentioned only as alternatives or are mutually exclusive.

The invention will be illustrated in more detail below with reference to the drawings. It should be noted that different aspects are described, each of which can be used individually or in combination. In other words, any aspect may be used with different embodiments of the invention unless explicitly presented as a pure alternative.

The drawings are purely schematic representations and are not true to scale. The drawings do not limit the invention in any way.

Figure 2:
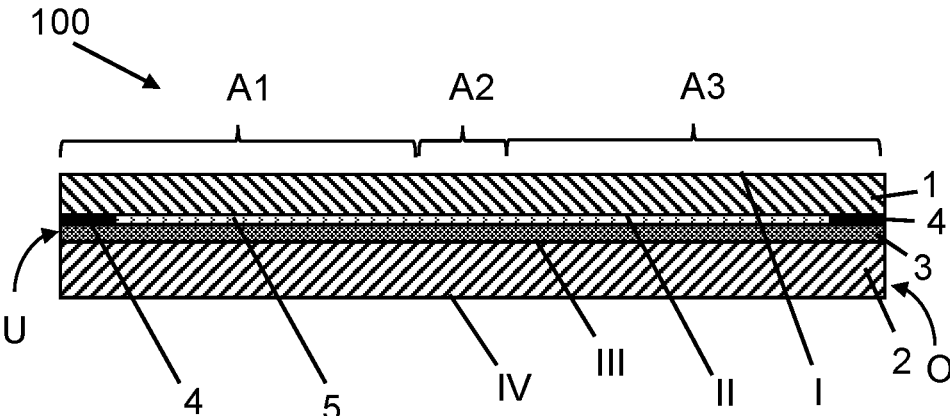
Figure 3:
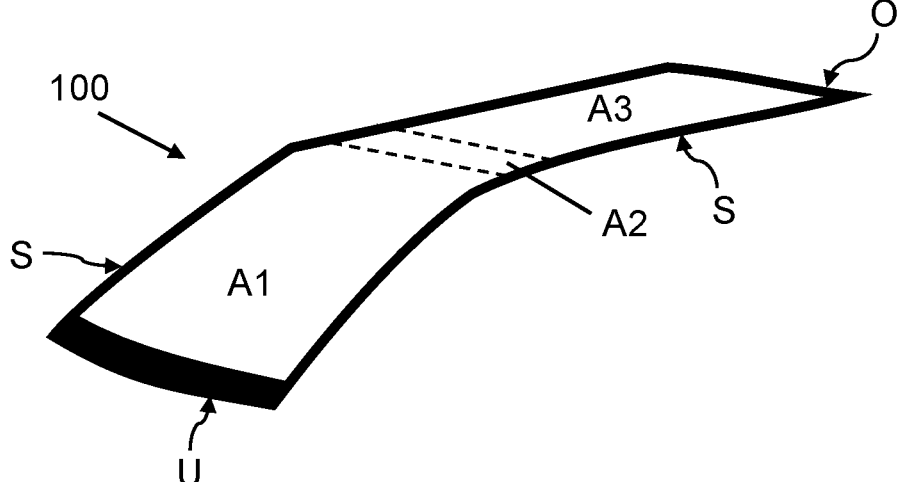
Figure 4:
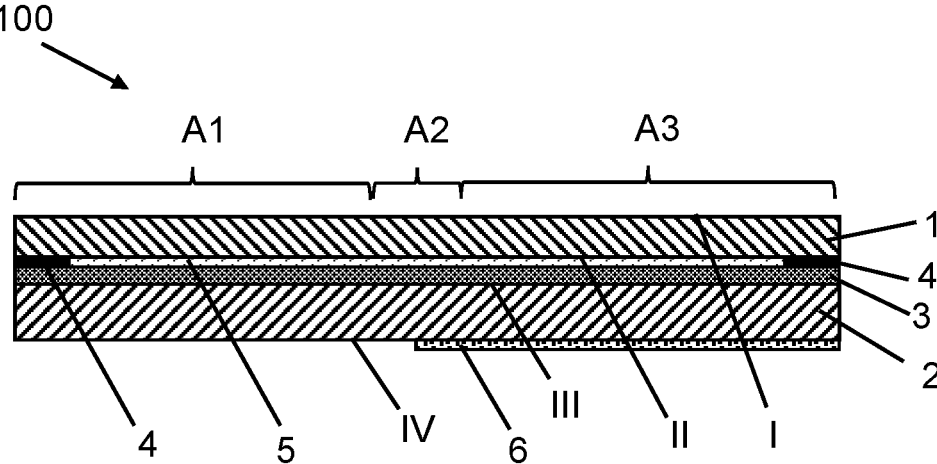
Figure 5:
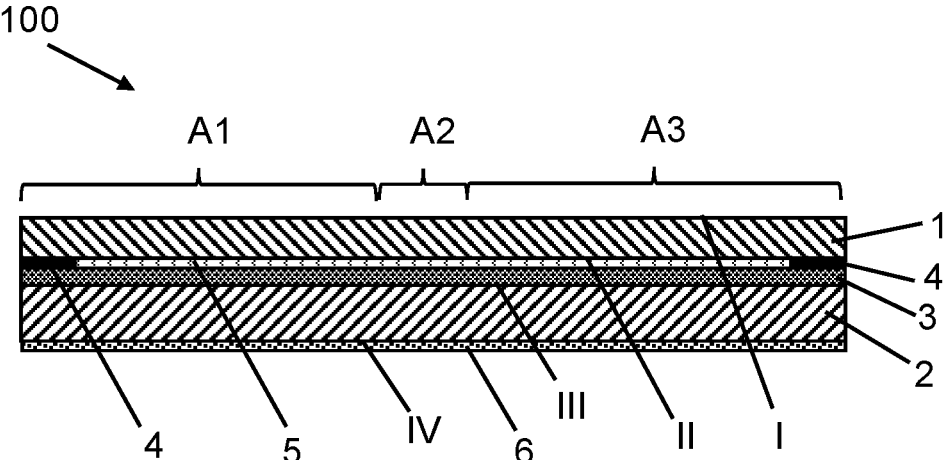
Figure 6:
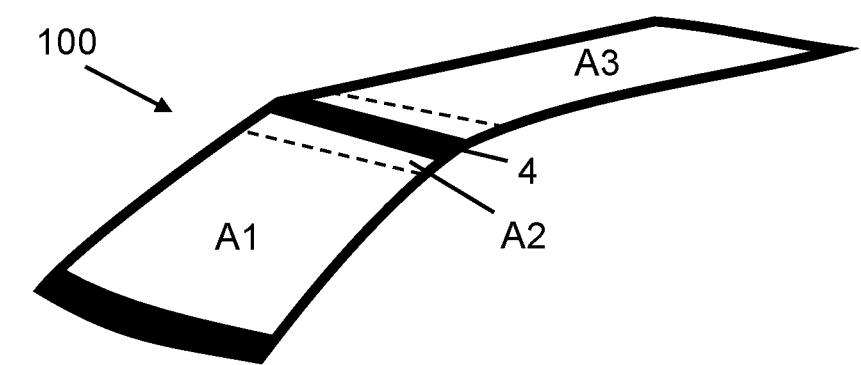
Figure 7:
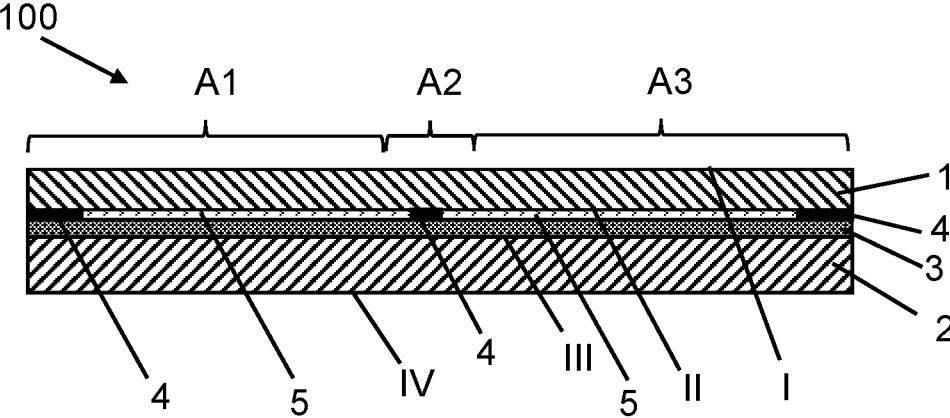
Figure 8:
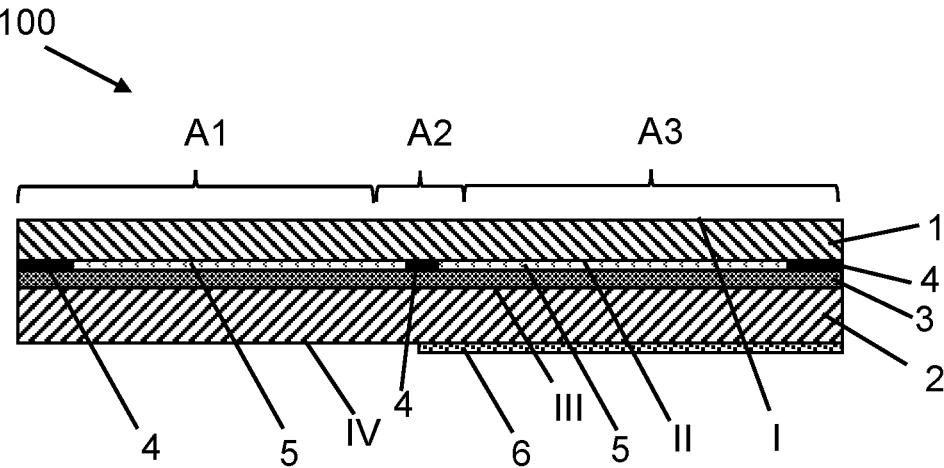
Figure 9:
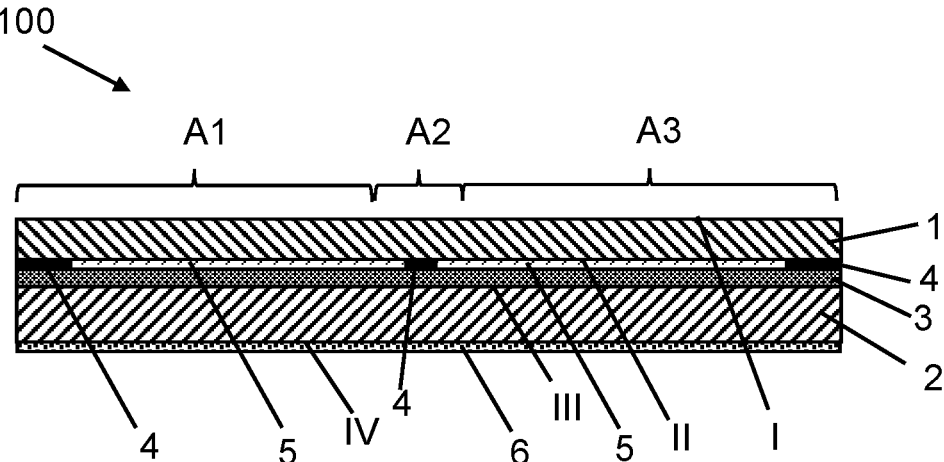
Figure 10:
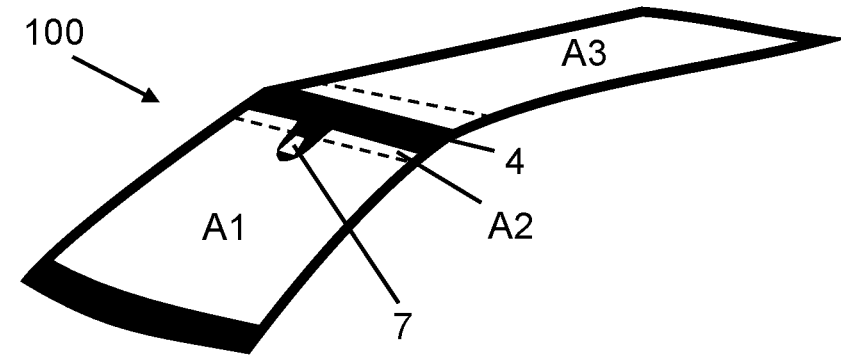
Figure 11:
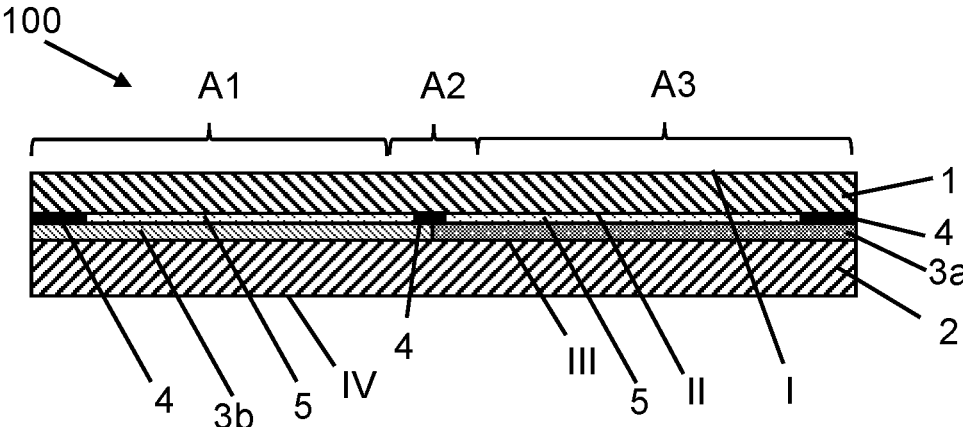
Figure 12:
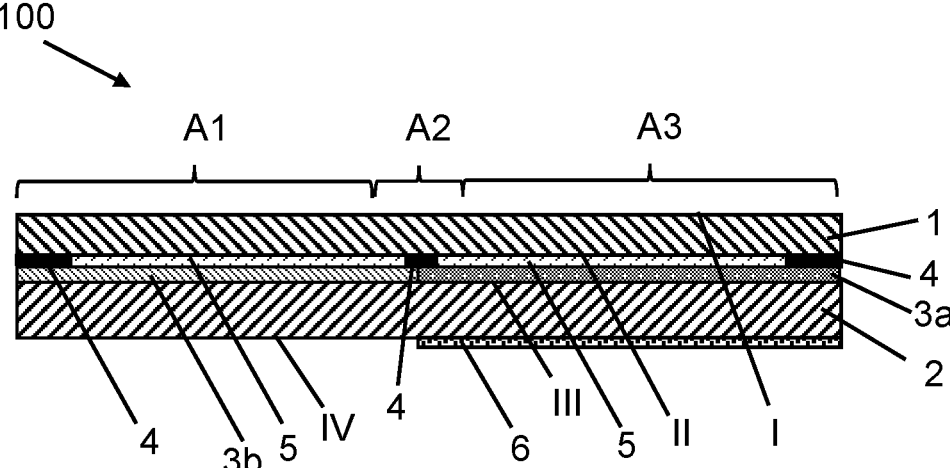
Figure 13:
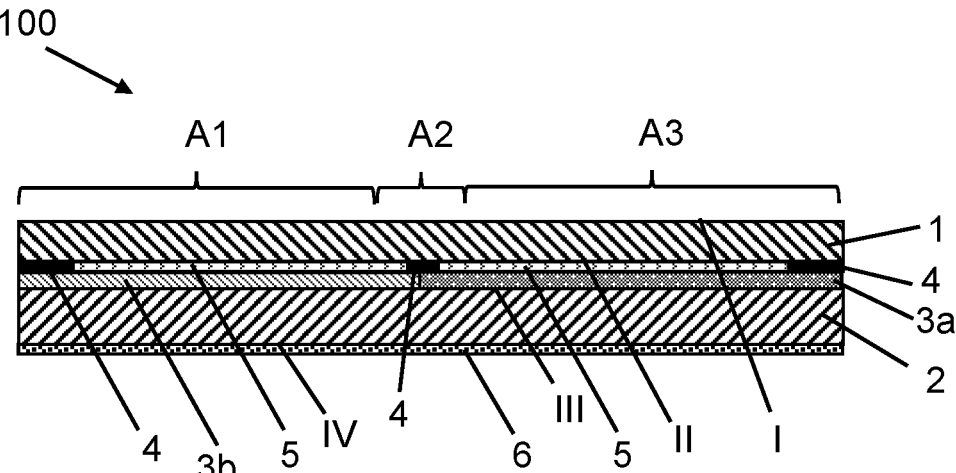
Figure 14:
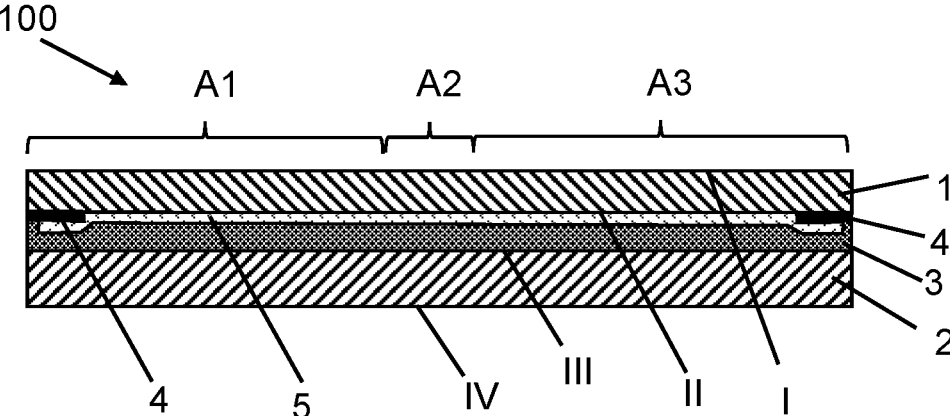
Figure 15:
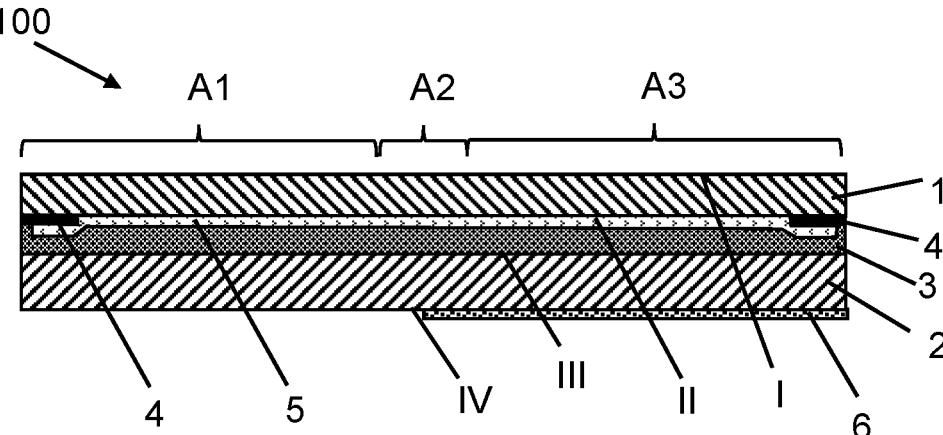
Figure 18:
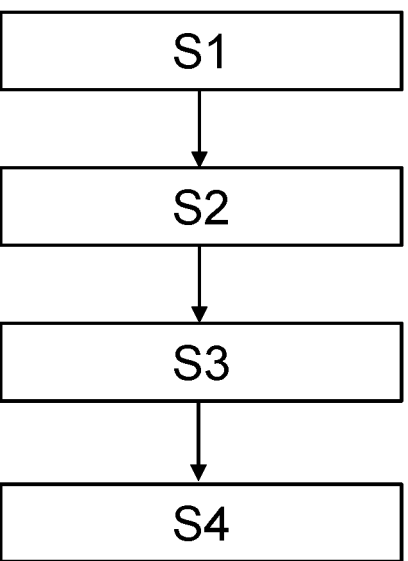

In the drawings:

FIG. 1 shows a perspective view of an embodiment of a vehicle laminated pane according to the invention, FIG. 2 shows a cross-section through the embodiment of the vehicle laminated pane according to the invention shown in FIG. 1, FIG. 3 shows a perspective view of a further embodiment of a vehicle laminated pane according to the invention, FIG. 4 shows a cross-section through a further embodiment of the vehicle laminated pane according to the invention, FIG. 5 shows a cross-section through a further embodiment of the vehicle laminated pane according to the invention, FIG. 6 shows a perspective view of a further embodiment of a vehicle laminated pane according to the invention, FIG. 7 shows a cross-section through the embodiment of the vehicle laminated pane according to the invention shown in FIG. 6, FIG. 8 shows a cross-section through a further embodiment of the vehicle laminated pane according to the invention, FIG. 9 shows a cross-section through a further embodiment of the vehicle laminated pane according to the invention, FIG. 10 shows a perspective view through a further embodiment of a vehicle laminated pane according to the invention, FIG. 11 shows a cross-section through a further embodiment of the vehicle laminated pane according to the invention, FIG. 12 shows a cross-section through a further embodiment of the vehicle laminated pane according to the invention, FIG. 13 shows a cross-section through a further embodiment of the vehicle laminated pane according to the invention, FIG. 14 shows a cross-section through a further embodiment of the vehicle laminated pane according to the invention, FIG. 15 shows a cross-section through a further embodiment of the vehicle laminated pane according to the invention, FIG. 16 shows a cross-section through a further embodiment of the vehicle laminated pane according to the invention, FIG. 17 shows a schematic illustration of the structure of a sun protection coating applied to the outer pane of a vehicle laminated pane according to the invention, and FIG. 18 shows a flowchart of an embodiment of the method according to the invention.

For simplification, the cross-sectional drawings are shown flat in each case. However, as can be seen from the perspective views, the vehicle laminated panes 100 according to the invention shown in cross-section are each curved laminated panes.

FIG. 1 shows a perspective view of an embodiment of a vehicle laminated pane 100 according to the invention and FIG. 2 shows a cross-section through the embodiment of the vehicle laminated pane 100 according to the invention shown in FIG. 1. The laminated pane 100 shown in FIGS. 1 and 2 is designed as a combined front and roof pane with a lower edge U, an upper edge O and two lateral pane edges S and comprises an outer pane 1 and an inner pane 2, which are connected to one another via a thermoplastic intermediate layer 3. The outer pane 1 has an outer-side surface I and an interior-side surface II, while the inner pane 2 has an outer-side surface III and an interior-side surface IV. The interior-side surface II of the outer pane 1 and the outer-side surface III of the inner pane 2 face one another.

The vehicle laminated pane 100 has three regions. A first region A1, which extends from the lower edge U and extends in the direction of the upper edge O, a third region A3, which extends from the upper edge O and extends in the direction of the lower edge U, and a second region A2, which connects the first region A1 to the third region A3.

In the embodiment shown in FIGS. 1 and 2, the interior-side surface II of the outer pane 1 has an opaque cover print 4, for example formed from an opaque enamel, in a peripheral edge region.

In this embodiment, the thermoplastic intermediate layer 3 contains PVB, for example, has a thickness of 0.76 mm and is tinted, for example, in the second region A2 and the third region A3, wherein the dye concentration decreases in the second region towards the first region A1.

The outer pane 1 and the inner pane 2 consist of clear soda lime glass and have, for example, a thickness of 2.1 mm.

In this embodiment a sun protection coating 5 is arranged on the interior-side surface II of the outer pane 1. The sun protection coating 5 extends over the entire interior-side surface II of the outer pane 1 minus a peripheral frame-shaped region in which the opaque cover print 4 is arranged. This can be achieved, for example, by first applying the sun protection coating over the full area and by then applying an opaque cover print 4 formed from a printing ink with decomposing properties relative to the sun protection coating.

The sun protection coating 5 comprises, for example, at least three functional silver layers which each have a layer thickness between 5 nm and 20 nm, wherein each functional silver layer is arranged between dielectric modules, for example layers of silicon nitride. The silver layers (Ag1, Ag2, Ag3) of the sun protection coating according to the invention have a relative geometric layer thickness in relation to each other of 0.4<Ag1/Ag3<1.7, wherein Ag2 or Ag3 is the thickest silver layer and the dielectric modules (M1, M2, M3, M4) have a relative optical layer thickness in relation to each other of M2/M1≥1.9, M2/M3≥0.8 and M2/M4≥1.6. The sun protection coating 5 leads to a reduced heating of the vehicle interior and the inner pane 2 due to the reflection of infrared radiation. According to the invention, an energy reflection RE can be >36%, preferably >39%. In addition, with such a sun protection coating 5, a good improved thermal comfort, compared to previously known systems, is simultaneously also achieved in addition to good optical and aesthetic properties of the vehicle laminated pane 100. Both the a* color coordinate and the b* color coordinate of the reflection at an angle of 8° or of 60° are in each case smaller than zero in the vehicle laminated pane 100 shown in FIG. 1 and FIG. 2. The reflection color is therefore neutral to blue/greenish It can be seen from FIG. 1 that, in this embodiment, the first region A1 substantially corresponds to the region of the vehicle laminated pane which, in the installed position, corresponds to the front screen, in particular the windshield, and the third region A3 substantially corresponds to the region of the vehicle laminated pane which, in the installed position, corresponds to the roof pane, wherein the second region A2 connects the first region A1 to the third region A3.

FIG. 3 shows a perspective view of a further embodiment of a vehicle laminated pane 100 according to the invention, wherein this embodiment differs from the embodiment shown in FIG. 1 only in that the first region A1 substantially corresponds to the region which corresponds to a panoramic windshield, which extends, for example, to the B-pillar of the vehicle in the installed position.

FIG. 4 shows a cross-section through a further embodiment of the vehicle laminated pane 100 according to the invention, wherein the embodiment shown in FIG. 4 differs from the cross-section shown in FIG. 2 only insofar as a heat-ray-reflecting coating 6 is arranged on the interior-side surface IV of the inner pane 2 in the third region A3 and in a partial region of the second region A2.

In this embodiment it is possible that the vehicle laminated pane 100 can have not only a good energy reflection RE>40%, but, in the third region A3, in which the heat-ray-reflecting coating 6 is arranged and the thermoplastic intermediate layer 3 is tinted dark, also a particularly low total transmitted thermal radiation of TTS<14%. The heat-ray-reflecting coating 6, on the one hand, reduces the emission of thermal radiation through the vehicle laminated pane 100 into the vehicle interior, in particular at high outside temperatures. The heat-ray-reflecting coating 6 can, on the other hand, reduce the emission of thermal radiation from the vehicle interior at low outside temperatures. In addition, the heat-ray-reflecting coating 6 can reduce the transmission of visible light into the vehicle interior. As a result, the room climate of the vehicle interior can be significantly improved and the need to use air conditioning systems can be reduced.

FIG. 5 shows a cross-section through a further embodiment of the vehicle laminated pane 100 according to the invention, wherein the embodiment shown in FIG. 5 differs from the cross-section shown in FIG. 4 only insofar as the heat-ray-reflecting coating is arranged on the entire interior-side surface IV of the inner pane 2.

FIG. 6 shows a perspective view of a further embodiment of a vehicle laminated pane 100 according to the invention and FIG. 7 shows a cross-section through the embodiment of the vehicle laminated pane 100 according to the invention shown in FIG. 6. The laminated pane 100 shown in FIGS. 6 and 7 differs from the one shown in FIGS. 1 and 2 only in that the opaque cover print 4 on the interior-side surface II of the outer pane 1 is arranged not only in a peripheral edge region, but additionally also in a region lying in the second region A2, wherein this region extends as a strip between the lateral pane edges.

FIG. 8 shows a cross-section through a further embodiment of the vehicle laminated pane 100 according to the invention, wherein the embodiment shown in FIG. 8 differs from the one shown in FIG. 4 in cross-section only insofar as the opaque cover print 4 is arranged on the interior-side surface II of the outer pane 1 not only in a peripheral edge region, but additionally also in a region lying in the second region A2, wherein this region extends as a strip between the lateral pane edges.

FIG. 9 shows a cross-section through a further embodiment of the vehicle laminated pane 100 according to the invention, wherein the embodiment shown in FIG. 9 differs from the one shown in cross-section in FIG. 5 only insofar as the opaque cover print 4 is arranged on the interior-side surface II of the outer pane 1 not only in a peripheral edge region but additionally also in a region lying in the second region A2, wherein this region extends as a strip between the lateral pane edges.

FIG. 10 shows a perspective view of a further embodiment of a vehicle laminated pane 100 according to the invention, which differs from the embodiment shown in FIG. 6 only insofar as the cover print present in a region of the second region is widened in at least one region into the first region and has a recess for a sensor window 7.

FIG. 11 shows a cross-section through a further embodiment of the vehicle laminated pane 100 according to the invention, wherein the embodiment shown in FIG. 11 differs from the one shown in cross-section in FIG. 7 insofar as the thermoplastic intermediate layer 3 is composed of two parts designated in FIG. 11 with the reference signs 3a and 3b. The first part 3a and the second part 3b are welded together via a weld seam. As can be seen from FIG. 11, the weld seam is arranged, in a view looking through from outside, in the region of the second region A2 in which the opaque cover print 4 is additionally arranged. The first part 3a of the thermoplastic intermediate layer 3 is tinted or colored in the embodiment shown in FIG. 11, and the second part 3b of the thermoplastic intermediate layer is colorless.

FIG. 12 shows a cross-section through a further embodiment of the vehicle laminated pane 100 according to the invention, wherein the embodiment shown in FIG. 12 differs from the one shown in cross-section in FIG. 11 only insofar as a heat-ray-reflecting coating 6 is arranged on the interior-side surface IV of the inner pane 2 in the third region A3 and in a partial region of the second region A2.

FIG. 13 shows a cross-section through a further embodiment of the vehicle laminated pane 100 according to the invention, wherein the embodiment shown in FIG. 13 differs from the one shown in cross-section in FIG. 12 only insofar as the heat-ray-reflecting coating is arranged on the entire interior-side surface IV of the inner pane 2.

FIG. 14 shows a cross-section through a further embodiment of the vehicle laminated pane 100 according to the invention. The embodiment shown in FIG. 14 differs from the one shown in FIG. 2 insofar as the cover print 4, during the production of the vehicle laminated pane 100, was first applied to the inner surface II of the outer pane 1, followed by the sun protection coating 5. Therefore, the sun protection coating 5 is also arranged on a region of the cover print 4.

In a peripheral edge region, which is narrower than the peripheral edge region in which the cover print 4 is arranged, no sun protection coating 5 is arranged on the cover print 5 in order to protect the sun protection coating 5 in the vehicle laminated pane 100 against corrosion and damage.

FIG. 15 shows a cross-section through a further embodiment of the vehicle laminated pane 100 according to the invention. The embodiment shown in FIG. 15 differs from the one shown in FIG. 14 merely insofar as a heat-ray-reflecting coating 6 is arranged on the interior-side surface IV of the inner pane 2 in the third region A3 and in a partial region of the second region A2. It is understood that the heat-ray-reflecting coating 6 can optionally also be arranged on the entire interior-side surface IV of the inner pane 2.

FIG. 16 shows a cross-section through a further embodiment of the vehicle laminated pane 100 according to the invention. The embodiment shown in FIG. 16 differs from the embodiment shown in FIG. 15 merely in that the opaque cover print 4 is arranged on the interior-side surface II of the outer pane 1 not only in a peripheral edge region but additionally also in a region lying in the second region A2, and consequently the sun protection coating 5 is also arranged in this region on the opaque cover print 4. It is understood that, again, the heat-ray-reflecting coating 6 can optionally also be arranged on the entire interior-side surface IV of the inner pane 2.

FIG. 17 shows a schematic illustration of the structure of a sun protection coating 5 applied to the outer pane 1 of a vehicle laminated pane 100 according to the invention. In the embodiment shown, the sun protection coating 5 is applied to the interior-side surface II of the outer pane 1 as a substrate. The sun protection coating 5 shown contains three transparent functional silver layers Ag1, Ag2 and Ag3, which are in particular the infrared-radiation-reflecting layers. The silver layers can be deposited, for example, by means of sputtering in an argon atmosphere.

Above, below and between the silver layers Ag1, Ag2 and Ag3 there are arranged dielectric modules M1, M2, M3 and M4 comprising dielectric layers. The dielectric Module M1 is therefore arranged below the first silver layer Ag1 directly on the interior-side surface II of the outer pane 1; the second dielectric module M2 is arranged above the first silver layer Ag1. The first dielectric module M1 can be constructed, for example, starting from the outer pane 1, as a layer sequence of silicon nitride, $ZnSnO_x$ and ZnO layers. The silicon nitride layer can be deposited here, for example, from SiZrAl or SiAl in a nitrogen-containing atmosphere, and the zinc oxide layer can be deposited from ZnAl or ZnAlO in an oxygen-containing atmosphere.

The sun protection coating 5 contains at least one blocker layer; each functional silver layer Ag1, Ag2, Ag3 is particularly preferably in direct contact with at least one blocker layer B1, B2 and B3 as shown. According to the invention, the blocker layers preferably contain or consist of at least nickel, chromium, titanium or alloys thereof. The blocker layers B (B1, B2, B3) are preferably arranged between at least one functional silver layer and at least one dielectric layer. The blocker layers B provide protection of the functional layer during heating, in particular during the production of the vehicle laminated pane according to the invention.

FIG. 18 shows an exemplary embodiment of the method according to the invention on the basis of a flow diagram comprising the following steps.

S1 providing an outer pane 1 with an outer-side surface I, an interior-side surface II, an inner pane 2 with an outer-side surface III and an interior-side surface IV, and a thermoplastic intermediate layer 3;

S2 applying an opaque cover print 4 to the interior-side surface II of the outer pane 1 at least in a peripheral edge region and applying a sun protection coating 5 to the interior-side surface II of the outer pane 1;

S3 forming a layer stack at least comprising, in this order, outer pane 1, thermoplastic intermediate layer 3 and inner pane 2; and S4 connecting the layer stack formed of at least outer pane 1, thermoplastic intermediate layer 3 and inner pane 2 to form the vehicle laminated pane 100.

In one embodiment, glass panes are used as outer pane 1 and as inner pane 2. In a preferred embodiment of the method, a sun protection coating 5 with at least three functional silver layers Ag1, Ag2 and Ag3 and the at least four dielectric modules M1, M2, M3 and M4 is applied to the interior-side surface II of the outer pane 1 by means of magnetic-field-assisted sputtering.

The vehicle laminated pane 100 that can be produced by means of the method according to the invention has a lower edge U, an upper edge O and two lateral pane edges S. In addition, the vehicle laminated pane 100 has a first region A1 starting from the lower edge U, a third region A3 starting from the upper edge O, and a second region A2 connecting the first region A1 and the third region A3.

In a preferred embodiment of the method according to the invention, in step S2 the opaque cover print 4 is first applied and then the sun protection coating 5 is applied. In this way, for example, the embodiments shown in FIG. 14, FIG. 15 and FIG. 16 can be produced.

In an alternative preferred embodiment of the method according to the invention, in step S2 the sun protection coating 5 is applied first and then the opaque cover print 4 is applied, wherein the opaque cover print 4 is formed from a printing ink which has decomposing properties relative to the sun protection coating 5. In this way, for example, the embodiments shown in FIG. 2, FIG. 4, FIG. 5, FIG. 7, FIG. 8, FIG. 9, FIG. 11, FIG. 12 and FIG. 13 can be produced Optionally, the method according to the invention can comprise the additional step of applying a heat-ray-reflecting coating to the interior-side surface IV of the inner pane 2 at least in the third region A3.

The invention is illustrated by means of the following examples according to the invention and comparative examples not according to the invention.

Examples

All optical, aesthetic and energy properties of the laminated panes according to examples and comparative examples were measured in a laminated state. In the examples and comparative examples, the sun protection coating 5 was applied to the interior-side surface II of a clear outer pane 1 (example Planiclear) and laminated with a thermoplastic intermediate layer 3 and an inner pane 2. A tinted PVB film was used in the intermediate layer. A Low-E coating was applied on the interior-side surface IV of a dark-tinted inner pane 2 (example VG10). The Low-E coating had an emissivity of 30%. The Low-E coating was based on an ITO (indium tin oxide) layer encapsulated between dielectric layers ($Si_3N_4$, $SiO_x$). The examples and comparative examples had the same basic structure described, but differed in the sun protection coatings used.

Examples 1 to 10 according to the invention and comparative examples not according to the invention were produced as a laminated pane with the stated sun protection coatings.

For each example and comparative example, the stack structure of the sun protection coating (layers and layer thicknesses), as well as the optical properties of the coating in the finished laminated pane are indicated.

The layer sequences and layer thicknesses of the sun protection coatings according to examples 1 to 10 according to the invention are shown in Table 1a. In comparison, the comparative examples 1 to 4 not according to the invention are described in Table 1b. The relative layer thicknesses of the silver layers and the dielectric modules, as well as the values of the optical and energy properties are shown in Table 2a for examples 1 to 10 according to the invention and in Table 2b for comparative examples 1 to 4 not according to the invention. All layer thicknesses of the silver layers and the layers of the modules are indicated as geometric layer thicknesses. The relative layer thicknesses of the silver layers, indicated as thickness ratios Ag2/Ag1, Ag2/Ag3 and Ag1/Ag3, relate to the geometric layer thicknesses. The optical layer thicknesses were used for the relative layer thicknesses of the dielectric modules, given as thickness ratios M2/M1, M2/M3 and M2/M4.

The following abbreviations are used:

RE energy reflection [%]

TL visible light transmission [%]

TTS total transmitted thermal radiation [%]

TE total transmitted energy [%]

RL 8° visible reflection at a viewing angle of 8° [%]

a*, b* color coordinates in CIE color space (International Commission on Illumination), in each case measured in reflection at 60° and at 8°

$\Delta$a*, $\Delta$b* difference of the color coordinates during measurement in reflection at 60° and at 8°

Color R* color impression of the external reflection color perceived by the observer of the laminated pane in each case in reflection at 60° and at 8°

The values for light transmission (TL) and reflection (RL) refer to illuminant A, i.e., the visible portion of sunlight at a wavelength of 380 nm to 780 nm.

TABLE 1a

Examples 1-10 layer structures of the sun protection coating

| Layer sequence Outer pane 1 | Layer material | Layer thinckness [nm] according to the example according to the invention | | | | | | | | | |
| --- | --- | --- | --- | --- | --- | --- | --- | --- | --- | --- | --- |
| | Glass | #1 | #2 | #3 | #4 | #5 | #6 | #7 | #8 | #9 | #10 |
| M1 | $SiZrN_x$ | 16.1 | 15.7 | 15.7 | 16.4 | 8 | 9.8 | 7.3 | 10.6 | 9.8 | 10.8 |
| | $ZnSnO_x$ | 8 | 8 | 8 | 8 | 8 | 8 | 7.5 | 7.5 | 7.5 | 7.7 |
| | ZnO | 10 | 10 | 10 | 10 | 10 | 10 | 10.8 | 11 | 11 | 11.3 |
| Ag1 | Ag | 8.5 | 9.3 | 10 | 9.4 | 8 | 10.6 | 11.6 | 11.8 | 10.4 | 11.9 |
| B1 | NiCr | 0.2 | 0.2 | 0.2 | 0.2 | 0.2 | 0.2 | 0.6 | 0.6 | 0.3 | 0.1 |
| M2 | ZnO | 10 | 10 | 10 | 10 | 10 | 10 | 12.2 | 15 | 15 | 13.3 |
| | $SiZrN_x$ | 10 | 10 | 10 | 10 | 10 | 20.3 | 16.6 | 16 | 15.5 | 16.7 |
| | $Si_3N_4$ | 21.8 | 22.3 | 22.3 | 22.8 | 13.2 | 15 | 22.2 | 12.4 | 6.5 | 14.7 |
| | $SiZrN_x$ | 10 | 10 | 10 | 10 | 10 | 15 | 6.2 | 10.9 | 16.5 | 17.1 |
| | $ZnSnO_x$ | 8 | 8 | 8 | 8 | 8 | 8 | 7.5 | 9.3 | 9.3 | 8.7 |
| | ZnO | 10 | 10 | 10 | 10 | 10 | 10 | 12.2 | 14 | 14 | 12.4 |
| Ag2 | Ag | 10.5 | 11.4 | 12 | 11.8 | 10.2 | 12 | 12.6 | 14.2 | 15 | 14.4 |
| B2 | NiCr | 0.2 | 0.2 | 0.2 | 0.2 | 0.2 | 0.2 | 0.8 | 0.8 | 0.3 | 0.1 |
| M3 | ZnO | 10 | 10 | 10 | 10 | 10 | 10 | 10.8 | 13 | 13 | 12.8 |
| | $Si_3N_4$ | 15 | 15 | 15 | 15 | 15 | 15 | 24.4 | 5.4 | 10.5 | 14.9 |
| | $SiZrN_x$ | 31.1 | 31.3 | 31.3 | 33.1 | 28 | 20.9 | 9.9 | 13.8 | 16.6 | 17.5 |
| | $ZnSnO_x$ | 8 | 8 | 8 | 8 | 8 | 8 | 7.5 | 9.0 | 9 | 7.1 |
| | ZnO | 10 | 10 | 10 | 10 | 10 | 10 | 10.8 | 13 | 13 | 12.9 |
| Ag3 | Ag | 13.3 | 13.9 | 14 | 17.6 | 15.7 | 10.3 | 10.6 | 9.7 | 9.9 | 10.4 |
| B3 | NiCr | 0.2 | 0.2 | 0.2 | 0.2 | 0.2 | 0.2 | 1.5 | 0.5 | 1.3 | 0.1 |
| M4 | ZnO | 10 | 10 | 10 | 10 | 10 | 10 | 12.2 | 15 | 15 | 15.5 |
| | $Si_3N_4$ | 14.7 | 15.2 | 15.2 | 17 | 10.2 | 25.4 | 15.3 | 3.1 | 19.5 | 20.6 |

TABLE 1b

Comparative examples 1-4 layer structures of the sun protection coating

| Layer sequence | Layer material | \#1 | \#2 | \#3 | \#4 |
|---|---|---|---|---|---|
| | | Layer thicknesses [nm] according to the comparative example | | | |
| Outer pane 1 | Glass | | | | |
| M1 | SiZrN$_x$ | 22 | 16.4 | 9.8 | 9.8 |
| | ZnSnO$_x$ | 8 | 8 | 8 | 8 |
| | ZnO | 11 | 10 | 10 | 10 |
| Ag1 | Ag | 8.5 | 15 | 10.6 | 12.9 |
| B1 | NiCr | 0.2 | 0.2 | 0.2 | 0.2 |
| M2 | ZnO | 11 | 10 | 10 | 10 |
| | SiZrN$_x$ | 10 | 10 | 8 | 14.7 |
| | Si$_3$N$_4$ | 21.8 | 21.8 | 8 | 15 |
| | SiZrN$_x$ | 10 | 10 | 8 | 15 |
| | ZnSnO$_x$ | 8 | 8 | 8 | 8 |
| | ZnO | 11 | 10 | 10 | 10 |

TABLE 1b-continued

Comparative examples 1-4 layer structures of the sun protection coating

| Layer sequence | Layer material | \#1 | \#2 | \#3 | \#4 |
|---|---|---|---|---|---|
| | | Layer thicknesses [nm] according to the comparative example | | | |
| Ag2 | Ag | 10.5 | 12 | 12.5 | 10.6 |
| B2 | NiCr | 0.2 | 0.2 | 0.2 | 0.2 |
| M3 | ZnO | 11 | 11 | 10 | 10 |
| | Si$_3$N$_4$ | 15 | 15 | 15 | 15 |
| | SiZrN$_x$ | 31.1 | 22 | 30.6 | 19 |
| | ZnSnO$_x$ | 8 | 8 | 8 | 8 |
| | ZnO | 11 | 10 | 10 | 10 |
| Ag3 | Ag | 13.3 | 10.5 | 11.7 | 8.9 |
| B3 | NiCr | 0.2 | 0.2 | 0.2 | 0.2 |
| M4 | ZnO | 11 | 10 | 10 | 10 |
| | Si$_3$N$_4$ | 14.7 | 14.7 | 25.4 | 25 |

TABLE 2a

Examples 1-10 thickness ratios and optical properties in the laminate

Thickness ratios and optical properties according to example

| | \#1 | \#2 | \#3 | \#4 | \#5 | \#6 | \#7 | \#8 | \#9 | \#10 |
|---|---|---|---|---|---|---|---|---|---|---|
| | | | | | Thickness ratios | | | | | |
| Ag2/Ag1 | 1.23 | 1.23 | 1.20 | 1.25 | 1.27 | 1.10 | 1.10 | 1.20 | 1.40 | 1.20 |
| Ag2/Ag3 | 0.79 | 0.82 | 0.86 | 0.67 | 0.65 | 1.20 | 1.20 | 1.50 | 1.50 | 1.40 |
| Ag1/Ag3 | 0.64 | 0.67 | 0.71 | 0.53 | 0.51 | 1.00 | 1.10 | 1.20 | 1.10 | 1.10 |
| M2/M1 | 1.99 | 2.02 | 2.03 | 2.00 | 2.35 | 2.80 | 3.0 | 2.70 | 2.70 | 2.80 |
| M2/M3 | 0.92 | 0.92 | 0.93 | 0.91 | 0.85 | 1.20 | 1.20 | 1.40 | 1.30 | 1.3 |
| M2/M4 | 2.95 | 2.92 | 2.92 | 2.74 | 3.19 | 2.40 | 2.90 | 4.50 | 2.40 | 3.60 |
| | | | | | Optical properties | | | | | |
| TL | 6.2 | 6.2 | 6.1 | 5.5 | 5.6 | 6.3 | 5.2 | 5.2 | 5.40 | 6.2 |
| RL 8° | 11.7 | 12.1 | 12.0 | 18.9 | 17.4 | 11.9 | 10.7 | 12.9 | 14.0 | 13.8 |
| a*R 8° | −4.1 | −3.7 | −5.3 | −4.4 | −4.6 | −4.4 | −4.6 | −1.6 | −5.6 | −5.2 |
| b*R 8° | −10.8 | −11.5 | −11.3 | −10.6 | −6.6 | −10.8 | −10.3 | −10.5 | −8.9 | −8.5 |
| a*R 60° | −3.4 | −3.8 | −4.1 | −2.7 | −3.0 | −4.5 | −5.1 | −2.8 | −2.0 | −3.3 |
| b*R 60° | −7.5 | −6.6 | −6.0 | −8.4 | −2.7 | −7.2 | −7.5 | −6.2 | −8.4 | −8.3 |
| Color R*8° | blue | blue | blue | blue | blue | blue | blue | blue | blue | blue |
| Color R*60° | blue | blue | blue | blue | neutral | blue | blue | blue | blue | blue |
| Δ a*R (8° vs. 60°) | 0.7 | −0.1 | 1.2 | 1.7 | 1.6 | −0.1 | −0.5 | −1.2 | 3.6 | 1.9 |
| Δ b*R (8° vs. 60°) | 3.3 | 4.9 | 5.3 | 2.2 | 4.0 | 3.6 | 2.8 | 4.3 | 0.4 | 0.2 |
| RE | 44.0 | 44.8 | 47.6 | 51.0 | 49.2 | 45.2 | 41.7 | 44.4 | 44.1 | 46.7 |
| TE | 3.0 | 2.8 | 2.7 | 2.4 | 2.4 | 3.0 | 2.7 | 2.6 | 2.8 | 3.2 |
| TTS | 13.6 | 13.3 | 12.6 | 11.7 | 12.1 | 13.4 | 13.8 | 13.2 | 13.4 | 13.4 |

TABLE 2b

Comparative examples 1-4 thickness ratios
and optical properties in the laminate

| | Thickness ratios and optical properties according to comparative example | | | |
|---|---|---|---|---|
| | #1 | #2 | #3 | #4 |
| Thickness ratios | | | | |
| Ag2/Ag1 | 1.2 | 0.8 | 1.2 | 0.8 |
| Ag2/Ag3 | 0.8 | 1.1 | 1.1 | 1.2 |
| Ag1/Ag3 | 0.6 | 1.4 | 0.9 | 1.4 |
| M2/M1 | 1.7 | 2.0 | 1.9 | 2.6 |
| M2/M3 | 0.9 | 1.1 | 0.7 | 1.2 |
| M2/M4 | 2.9 | 3.0 | 1.5 | 2.2 |
| Optical properties | | | | |
| TL | 6.1 | 6.1 | 5.7 | 6.5 |
| RL 8° | 13.3 | 11.1 | 18.9 | 9.2 |
| a*R 8° | −14.1 | 2.2 | −0.6 | −4.3 |
| b*R 8° | 2.3 | 7.2 | 0.3 | −14.1 |
| a*R 60° | −13.0 | −3.0 | 9.7 | 2.3 |
| b*R 60° | −2.9 | 9.7 | 0.6 | −8.2 |
| Color R*8° | yellow-green | orange | neutral | blue |
| Color R*60° | green | yellow | red | purple |
| Δ a*R (8° vs. 60°) | 1.1 | −5.2 | 10.3 | 7.1 |
| Δ b*R (8° vs. 60°) | −5.2 | 2.5 | 0.3 | 6.2 |
| RE | 38.8 | 44.8 | 52.4 | 46.2 |
| TE | 3.6 | 3.1 | 2.4 | 3.0 |
| TTS | 15.3 | 13.6 | 12.7 | 13.2 |

Examples 1 to 5 according to the invention have silver layers Ag1, Ag2 and Ag3 with a relative geometric layer thickness of 0.4<Ag1/Ag3<0.9 and 0.5<Ag2/Ag3<1.0, wherein Ag3 is the thickest silver layer and the dielectric modules (M1, M2, M3, M4) have a relative optical layer thickness in relation to each other of M2/M1≥1.9, M2/M3≥0.8 and M2/M4≥1.6. Examples 1 to 5 have an improved energy reflection RE.

For examples 6 to 10 according to the invention, a relative geometric layer thickness of 0.6<Ag1/Ag3<1.7 applies to silver layers Ag1, Ag2 and Ag3, wherein Ag2 is the thickest silver layer and the dielectric modules (M1, M2, M3, M4) have a relative optical layer thickness in relation to each other of M2/M1≥2, M2/M3>1 and M2/M4≥2. These laminated panes are particularly advantageous with regard to the smallest possible angle-dependent color deviations Aa in reflection.

Further Examples

The layer sequences of the sun protection coatings and the layer thicknesses of the further examples A to E of vehicle laminated panes according to the invention are shown in Table 3a. The relative layer thicknesses of the silver layers and the dielectric modules, as well as the values for the optical and energy properties are reproduced in Table 3b and Table 3c.

TABLE 3a

| | Layer material | Layer thicknesses [nm] according to the example according to the invention | | | | |
|---|---|---|---|---|---|---|
| Layer sequence Outer pane 1 | Glass | Example A | Example B | Example C | Example D | Example E |
| First dielectric | SiNx | 8.0 | 10.6 | 9.0 | 16.4 | 7.9 |
| module M1 | ZnSnOx | 8.0 | 8.0 | 8.0 | 8.0 | 8.1 |
| | ZnO | 10.0 | 10.0 | 10.0 | 10.0 | 12.3 |
| First silver layer Ag1 | Ag | 15.8 | 19.0 | 16.5 | 17.8 | 13.3 |
| Blocker layer | NiCr | 0.2 | 0.2 | 0.2 | 0.2 | 0.2 |
| Second dielectric | ZnO | 10.0 | 10.0 | 10.0 | 10.0 | 15.0 |
| module M2 | SiNx | 52.0 | 39.2 | 52.0 | 46.0 | 37.9 |
| | ZnSnOx | 8.0 | 8.0 | 8.0 | 8.0 | 9.3 |
| | ZnO | 10.0 | 10.0 | 10.0 | 10.0 | 13.5 |
| Second silver layer Ag2 | Ag | 12.3 | 10.6 | 14.3 | 10.8 | 12.1 |
| Blocker layer | NiCr | 0.2 | 0.2 | 0.2 | 0.2 | 0.8 |
| Third dielectric | ZnO | 10.0 | 10.0 | 10.0 | 10.0 | 13.0 |
| module M3 | SiNx | 38.5 | 21.5 | 39.5 | 27.0 | 30.5 |
| | ZnSnOx | 8.0 | 8.0 | 8.0 | 8.0 | 9.1 |
| | ZnO | 10.0 | 10.0 | 10.0 | 10.0 | 14.2 |
| Third silver layer Ag3 | Ag | 9.5 | 10.0 | 8.5 | 8.3 | 9.9 |
| Blocker layer | NiCr | 0.2 | 0.2 | 0.2 | 0.2 | 0.2 |
| Fourth dielectric | ZnO | 10.0 | 10.0 | 10.0 | 10.0 | 16.8 |
| module M4 | SiNx | 22.5 | 20.0 | 35.6 | 20.3 | 18.7 |

TABLE 3b

Relative layer thicknesses in the sun protection coating
of the produced laminated panes of examples A to E

|  | A | B | C | D | E |
|---|---|---|---|---|---|
| Ag1/Ag2 | 1.28 | 1.79 | 1.15 | 1.65 | 1.10 |
| Ag2/Ag3 | 1.29 | 1.06 | 1.68 | 1.30 | 1.22 |
| Ag1/Ag3 | 1.66 | 1.90 | 1.94 | 2.14 | 1.34 |
| M2/M1 | 3.12 | 2.36 | 3.00 | 2.16 | 2.57 |
| M2/M3 | 1.21 | 1.37 | 1.19 | 1.36 | 1.13 |
| M2/M4 | 2.47 | 2.24 | 1.75 | 2.45 | 2.30 |

TABLE 3c

Energy and optical parameters of the
laminated panes from examples A to E

|  | A | B | C | D | E |
|---|---|---|---|---|---|
| TL | 5.4 | 5.2 | 5.6 | 5.3 | 6.2 |
| RL1 | 20.9 | 20.0 | 19.3 | 20.5 | 11.8 |
| a*R 8° | −0.9 | −12.6 | −8.5 | −10.0 | −5.0 |
| b*R 8° | −9.8 | −4.6 | −18.8 | −11.1 | −10.5 |
| RL 60° | 21.5 | 22.0 | 18.9 | 20.9 | 15.5 |
| a*R 60° | −3.2 | −3.3 | −3.2 | −4.2 | −3.3 |
| b*R 60° | −8.2 | −6.9 | −18.9 | −12.4 | −8.4 |
| RE | 45.6 | 50.7 | 47.6 | 48.5 | 45.3 |
| TTS | 13.7 | 12.2 | 13.2 | 12.9 | 13.8 |
| Ext color | blue | green | blue | green | blue |
| Color at 60° | blue | blue | blue | blue | blue |

The laminated panes of examples 1 to 10 and A to E are improved with respect to energy properties, thermal and visual comfort and at the same time with respect to aesthetic appearance and further optimized compared to known laminated panes with sun protection coatings. The energy reflection of RE>39% was able to be achieved. With such a sun protection coating in conjunction with a heat-ray-reflecting coating, laminated panes can be provided which can additionally have a particularly low total transmitted thermal radiation (TTS) of less than 14%, wherein at the same time an optimal aesthetic appearance can be achieved without undesired hues in the reflection of the laminated pane. In particular, undesired red and yellow reflections or cloudiness of the laminated pane can be avoided. According to the invention, substantially a constant, desired color reflection of the laminated pane can be achieved independently of the viewing angle.

The laminated panes of examples 1 to 10 and A to E have a reflection color in reflection at an angle of 60° and a reflection color at an angle of 8°, the color coordinate a* of each of these having a negative value in the CIE color space, and the color coordinate b* of each of these having a negative value in the CIE color space.

LIST OF REFERENCE SIGNS

100 Vehicle laminated pane
1 Outer pane
2 Inner pane
3 Thermoplastic intermediate layer
3a First part of the thermoplastic intermediate layer
3b Second part of the thermoplastic intermediate layer
4 Opaque cover print
5 Sun protection coating
6 Heat-ray-reflecting coating
7 Sensor window
A1 First region
A2 Second region A3 Third region
I Outer-side surface of 1
II Interior-side surface of 1
III Outer-side surface of 2
IV Interior-side surface of 2
Ag1 First silver layer
Ag2 Second silver layer
Ag3 Third silver layer
M1 First dielectric module
M2 Second dielectric module
M3 Third dielectric module
M4 Fourth dielectric module
B Blocker layer
B1 First blocker layer
B2 Second blocker layer
B3 Third blocker layer

The invention claimed is:

1. A vehicle laminated pane, designed as a combined front and roof pane, with a lower edge and an upper edge and two lateral pane edges at least comprising an outer pane with an outer-side surface and an interior-side surface, an inner pane with an outer-side surface and an interior-side surface and a thermoplastic intermediate layer which connects the outer pane to the inner pane, wherein the vehicle laminated pane has a first region starting from the lower edge, a third region starting from the upper edge, and a second region connecting the first region and the third region, at least in a peripheral edge region of the vehicle laminated pane, the interior-side surface of the outer pane has an opaque cover print, and a sun protection coating is applied to the interior-side surface of the outer pane, and wherein the vehicle laminated pane has a reflection color in reflection at an angle of 60° and a reflection color in reflection at an angle of 8°, the a* color coordinate of each of which has a negative value in the CIE color space and the b* color coordinate of each of which has a negative value in the CIE color space.

2. The vehicle laminated pane according to claim 1, wherein the sun protection coating, starting from the outer pane in the direction of the inner pane, comprises the following layer sequence first dielectric module M1,
first silver layer Ag1,
second dielectric module M2,
second silver layer Ag2,
third dielectric module M3,
third silver layer Ag3,
fourth dielectric module M4.

3. The vehicle laminated pane according to claim 2, wherein the first, second and third silver layers Ag1, Ag2, Ag3 have a relative geometric layer thickness in relation to each other of 0.4<Ag1/Ag3<1.7 and Ag3 or Ag2 is the thickest silver layer, and the first, second, third and fourth dielectric modules M1, M2, M3, M4 have a relative optical layer thickness of M2/M1≥1.9, M2/M3≥0.8 and M2/M4≥1.6.

4. The vehicle laminated pane according to claim 2, wherein the first, second and third silver layers Ag1, Ag2, Ag3 have a relative geometric layer thickness in relation to each other of Ag1/Ag2>1 and Ag1/Ag3>1 and the first, second, third and fourth dielectric modules M1, M2, M3, M4 have a relative optical layer thickness of M2/M1>1, M2/M3>1 and M2/M4>1.

5. The vehicle laminated pane according to claim 1, wherein the interior-side surface of the inner pane has a heat-ray-reflecting coating at least in the third region.

6. The vehicle laminated pane according to claim 1, wherein the thermoplastic intermediate layer in the third region is tinted or colored and optionally also tinted or colored in the second region.

7. The vehicle laminated pane according to claim 1, wherein the interior-side surface of the outer pane additionally has the opaque cover print in a region lying in the second region, said opaque cover print optionally being widened in at least one region into the first region and optionally having at least one recess for a sensor window.

8. The vehicle laminated pane according to claim 7, wherein the thermoplastic intermediate layer is composed of two parts which are welded together at a weld seam, wherein the weld seam is arranged in the region of the second region in which the opaque cover print is additionally arranged when looking through perpendicularly from the outside.

9. The vehicle laminated pane according to claim 1, wherein the opaque cover print is an opaque enamel or an opaque lacquer.

10. The vehicle laminated pane according to claim 1, wherein the opaque cover print is formed from a printing ink which has decomposing properties relative to the sun protection coating.

11. The vehicle laminated pane according to claim 1, additionally comprising a switchable functional element and/or at least one illumination element.

12. A method for producing a vehicle laminated pane according to claim 1, comprising:

a) providing an outer pane with an outer-side surface and an interior-side surface, an inner pane with an outer-side surface and an interior-side surface, and a thermoplastic intermediate layer;

b) applying an opaque cover print to the interior-side surface of the outer pane at least in a peripheral edge region and applying a sun protection coating to the interior-side surface of the outer pane;

c) forming a layer stack at least comprising, in this order, outer pane, thermoplastic intermediate layer and inner pane, and d) connecting the layer stack formed of at least outer pane, thermoplastic intermediate layer and inner pane to form the vehicle laminated pane.

13. The method for producing a vehicle laminated pane according to claim 12, wherein in step b) the opaque cover print is first applied and the sun protection coating is then applied.

14. The method for producing a vehicle laminated pane according to claim 12, wherein in step b) the sun protection coating is first applied and the opaque cover print is then applied, wherein the opaque cover print is formed from a printing ink which has decomposing properties relative to the sun protection coating.

15. A method comprising providing a vehicle laminated pane according to claim 1 as a combined front and roof pane in a transportation vehicle for traffic on land, in the air or in water.

16. The vehicle laminated pane according to claim 6, wherein the dye concentration in the second region decreases in the direction of the first region.

17. The method according to claim 15, wherein the transportation vehicle is a rail vehicle or a motor vehicle.

18. The method according to claim 15, wherein the combined front and roof pane is a combined windshield and roof pane of a passenger car.

\* \* \* \* \*